(12) United States Patent
Broderick

(10) Patent No.: US 9,125,423 B2
(45) Date of Patent: Sep. 8, 2015

(54) ANIMAL EUTHANASIA APPARATUS

(71) Applicant: Clifford Broderick, Newburgh, NY (US)

(72) Inventor: Clifford Broderick, Newburgh, NY (US)

(*) Notice: Subject to any disclaimer, the term of this patent is extended or adjusted under 35 U.S.C. 154(b) by 224 days.

(21) Appl. No.: 13/772,698

(22) Filed: Feb. 21, 2013

(65) Prior Publication Data

US 2014/0230743 A1 Aug. 21, 2014

(51) Int. Cl.
*F26B 25/00* (2006.01)
*A22B 3/00* (2006.01)

(52) U.S. Cl.
CPC .................................... *A22B 3/005* (2013.01)

(58) Field of Classification Search
CPC ............. A01K 1/03; F24D 5/02; F24D 5/04; F24D 5/00; A22B 3/005
USPC ............. 119/416–421; 600/21; 49/467, 469, 49/477.1, 483.1, 484.1; 128/200.24; 110/173 R; 34/242; 126/190; 237/46, 237/50; 452/66
See application file for complete search history.

(56) References Cited

U.S. PATENT DOCUMENTS

| | | | | |
|---|---|---|---|---|
| 1,849,194 A | * | 3/1932 | McCurrie | 604/23 |
| 3,593,971 A | * | 7/1971 | Blackman | 277/646 |
| 4,107,818 A | * | 8/1978 | Scott et al. | 606/1 |
| 4,371,175 A | * | 2/1983 | Van Dyk, Jr. | 174/357 |
| 6,588,140 B1 | * | 7/2003 | Johnson et al. | 43/124 |
| 7,908,791 B1 | * | 3/2011 | Brash | 43/125 |
| 8,267,080 B2 | * | 9/2012 | Sundberg | 128/202.12 |
| 8,492,660 B2 | * | 7/2013 | Carducci et al. | 174/364 |
| 2001/0034963 A1 | * | 11/2001 | Jones | 43/124 |
| 2003/0118474 A1 | * | 6/2003 | Brash | 422/28 |
| 2006/0009142 A1 | * | 1/2006 | Cattaruzzi | 452/66 |
| 2006/0086038 A1 | * | 4/2006 | Mosher | 43/124 |

* cited by examiner

*Primary Examiner* — Rob Swiatek
*Assistant Examiner* — Ebony Evans
(74) *Attorney, Agent, or Firm* — Thomas A. O'Rourke; Booner & O'Rourke, LLP

(57) ABSTRACT

An animal euthanasia device includes a chamber with an opening through which a partitioned cage may be wheeled. A pivotally attached door seals the opening using fixed edge seals and an inflatable door threshold seal. A latch secures the door, once closed. After a sensor verifies door closure, an electro-magnetic lock prevents inadvertent door opening during the process, which may be automated using a programmable logic controller (PLC). The PLC coordinates actuation of a fan and damper within an air exhaust opening, a fan and a damper within an exhaust gas opening, and a damper within a fresh air inlet opening, and also triggers a solenoid valve that controls flow of euthanizing gas into the chamber. A keyed selector switch controls power to the device to initiate the automated process, which is monitored using oxygen sensors, and $CO_2$ flow and pressure sensors, and is reported on a human machine interface.

35 Claims, 26 Drawing Sheets

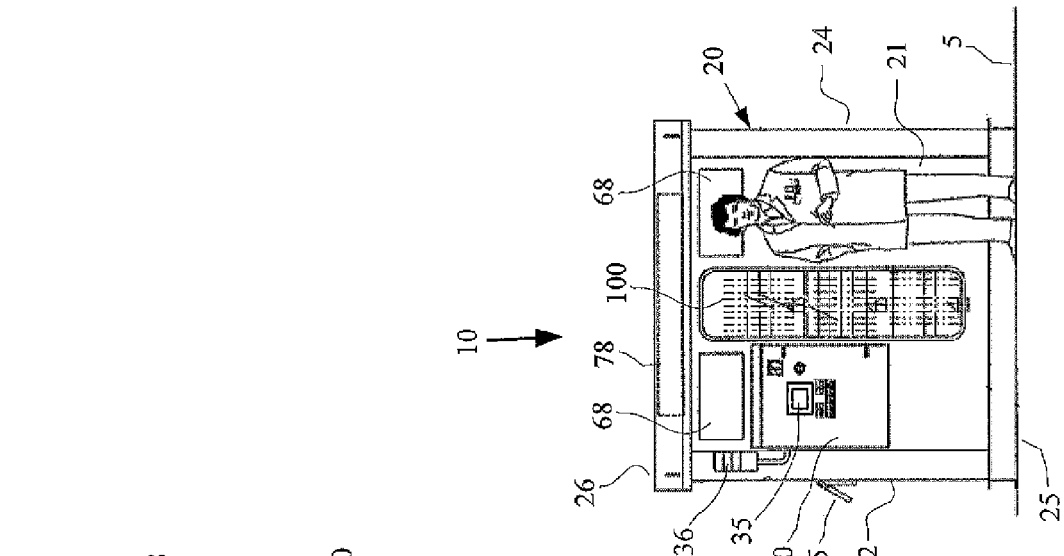
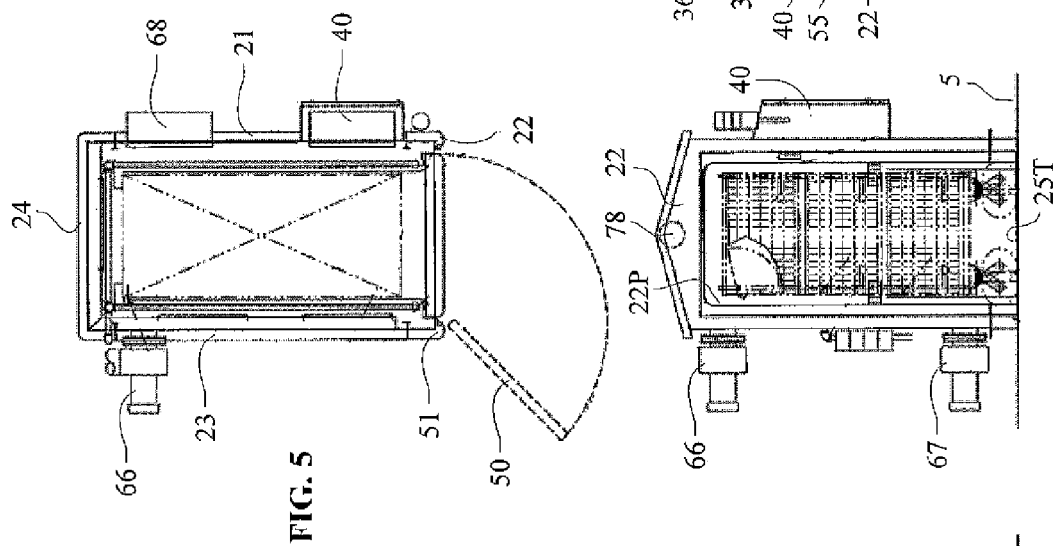
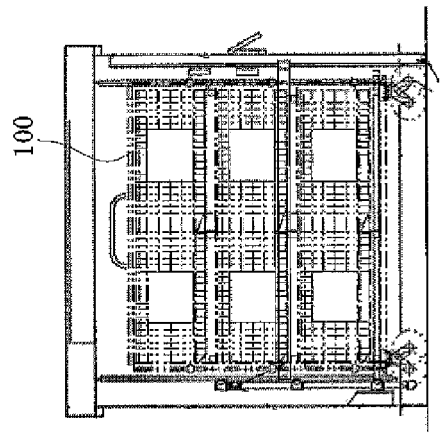
FIG. 2
FIG. 3
FIG. 5
FIG. 4

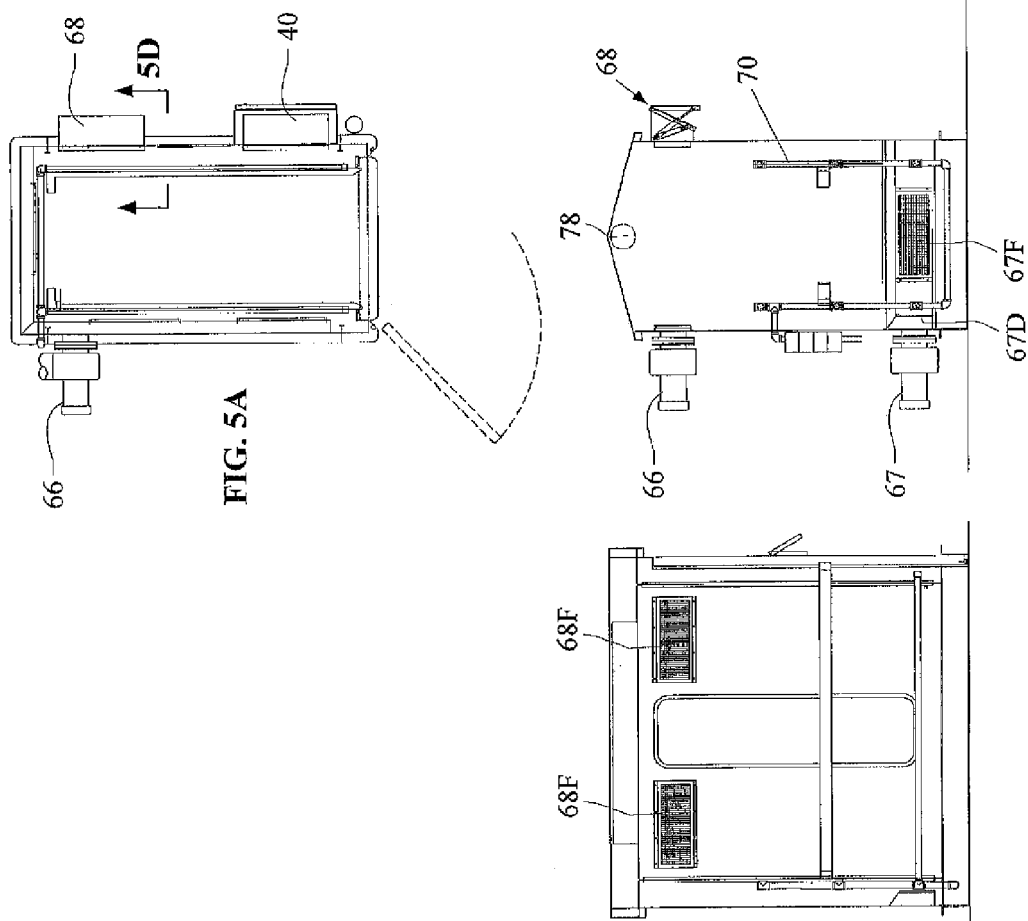

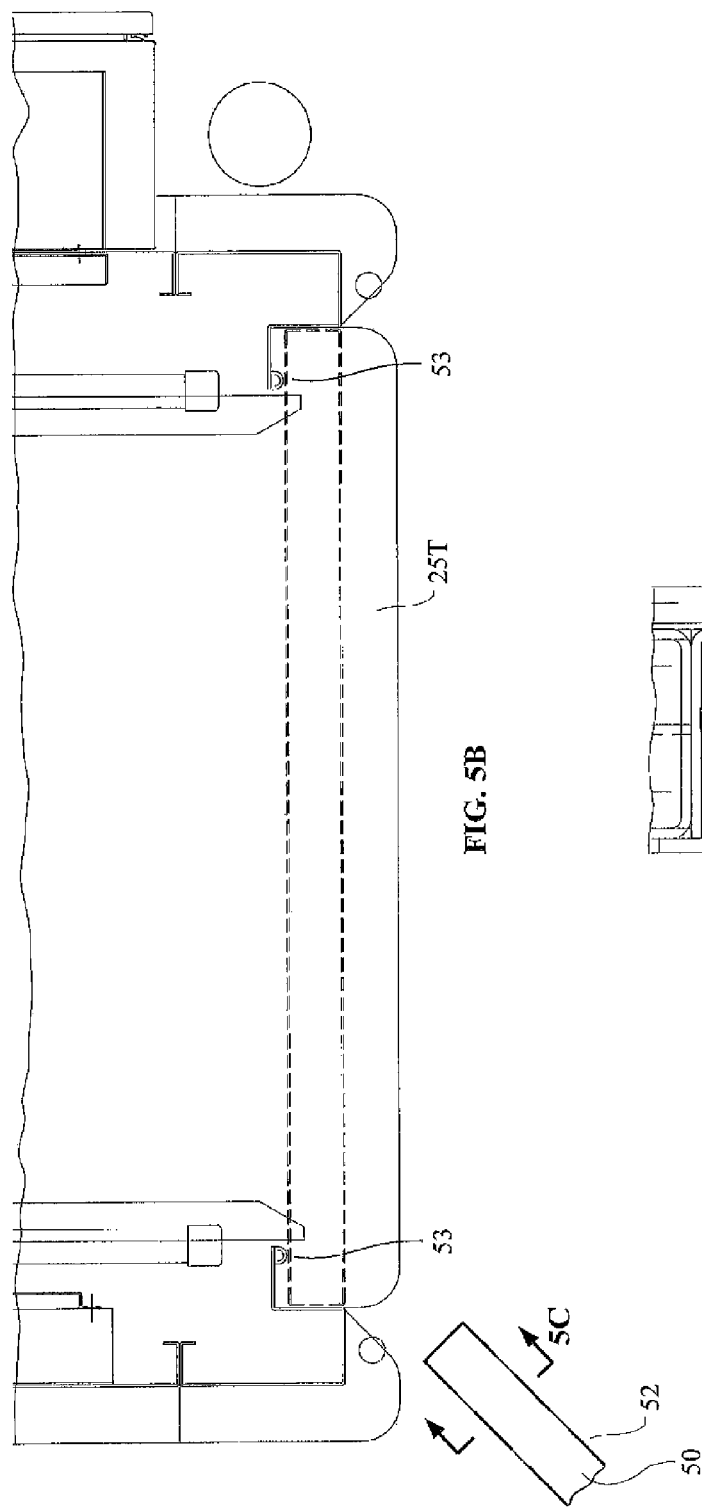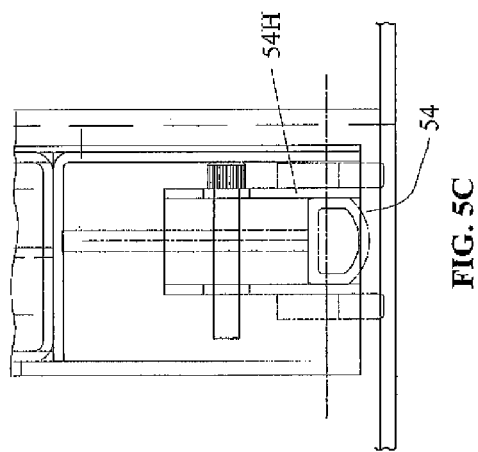

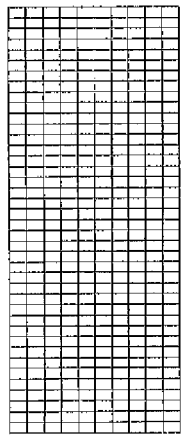
FIG. 7E
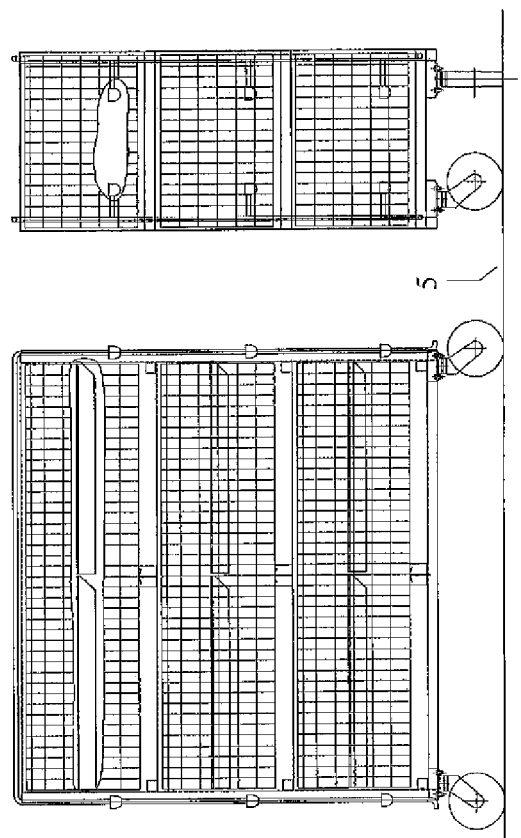
FIG. 7D
FIG. 7C
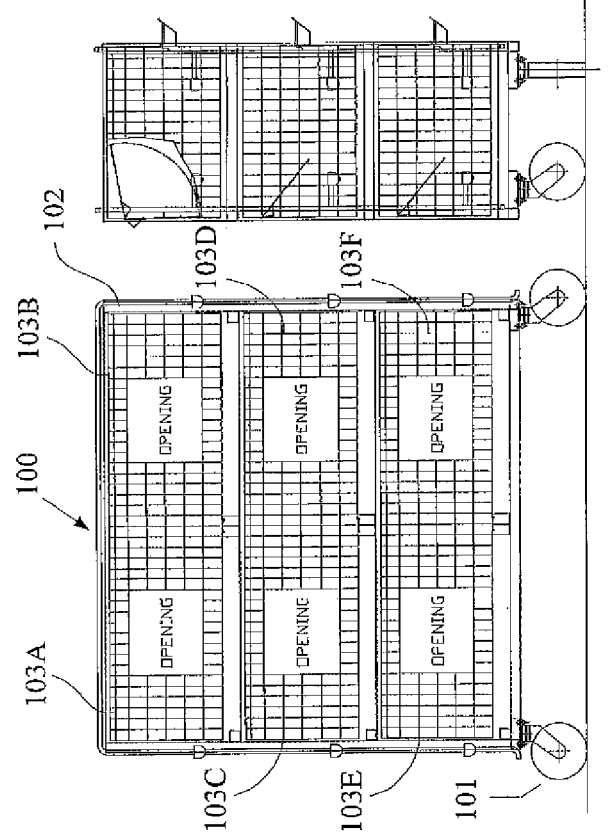
FIG. 7B
FIG. 7A

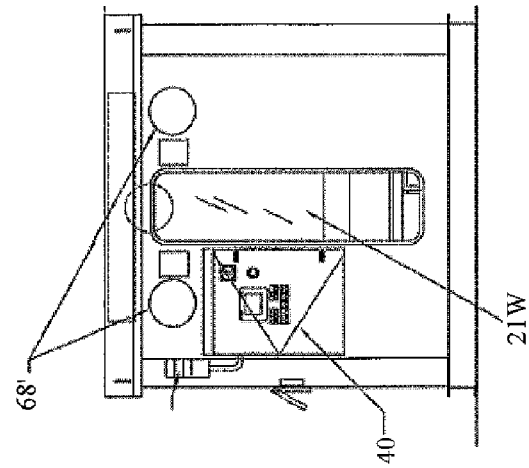
FIG. 13
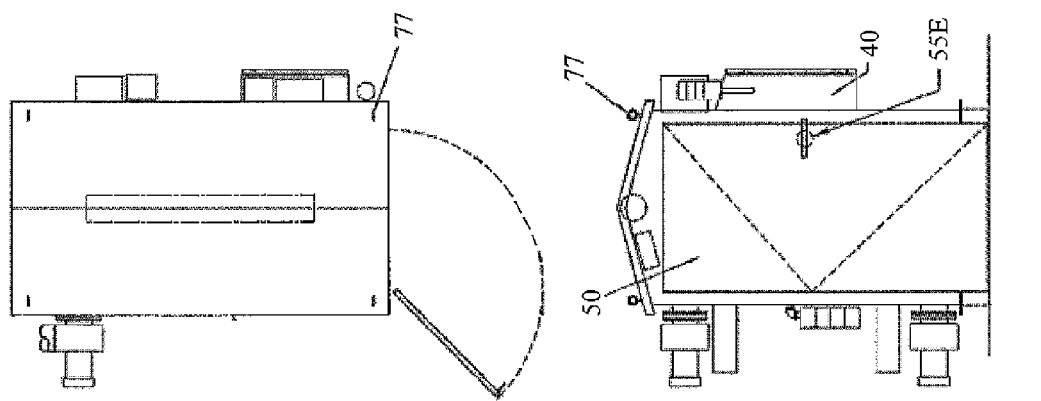
FIG. 14
FIG. 16
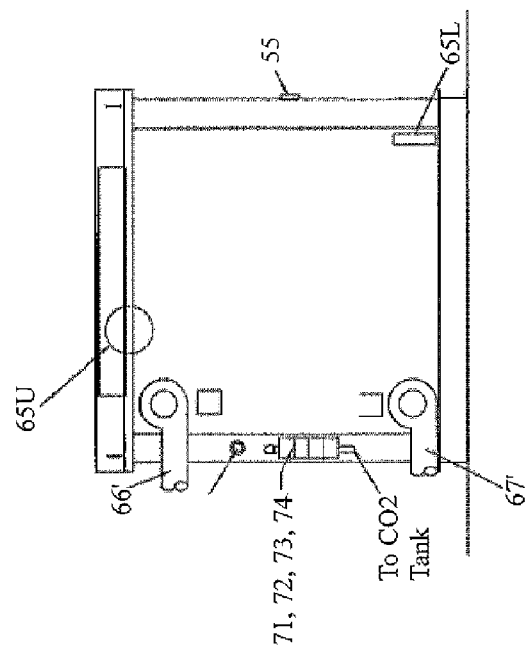
FIG. 15

ANIMAL EUTHANASIA APPARATUS

FIELD OF THE INVENTION

The present invention relates to improvements in apparatus for euthanizing animals, and more particularly to apparatus which are capable of safely and effectively euthanizing a large animal or a large number of animals in an automated process.

BACKGROUND OF THE INVENTION

Many reasons arise which necessitate that the life of an animal must be terminated with minimal pain and distress. The reasons for euthanasia may include the diagnosis of an incurable disease such as cancer, painful medical conditions, broken limbs, exposure to the rabies virus, deterioration and impairment due to old age, and/or dissection and analysis of animals used in laboratory experimentation. There are a number of methods for performing euthanasia on various different animals, and many organizations promulgate standards for these procedures, including those of the American Veterinary Medical Association—The AVMA Guidelines on Euthanasia. These methods may generally be categorized as Physical Methods (e.g., penetrating captive bolt, shotgun, . . . ), Non-inhalant Pharmaceutical Agents (Barbiturates, Potassium Chloride, . . . ), and Inhalant Agents (e.g., Carbon Dioxide, Nitrogen, Argon . . . ). In many instances it is desirable to terminate the animals with inhalant agents. Furthermore, it is advantageous in many instances to terminate multiple large-sized animals at the same time, preferably within their own cages. Although there have been a number of devices heretofore developed to assist operators in euthanizing animals, they fail to fully accommodate performance of the process in strict accordance with many guidelines necessary to safely complete the procedure—both for the safety of the operator, and for the safe and humane treatment of the animals to be terminated. The apparatus of the present invention overcomes many of the disadvantages of the prior art, which will become apparent in the subsequent discussion.

OBJECTS OF THE INVENTION

It is an object of the invention to provide apparatus necessary to safely euthanize an animal.

It is another object of the invention to provide an apparatus that may be used to euthanize a plurality of large animals simultaneously.

It is a further object of the invention to provide an automated apparatus that may be used to safely euthanize animals.

It is another object of the invention to provide such automation that may be adjustable to safely euthanize various different species of animals.

It is also an object of the invention to provide such automation that may be adjustable to safely euthanize animals in accordance with different standards.

Further objects and advantages of the invention will become apparent from the following description and claims, and from the accompanying drawings.

SUMMARY OF THE INVENTION

A device for euthanizing animals may include a specially constructed chamber with a door securable over an opening to the chamber cavity, being sealable on three sides against a door seal. The bottom of the opening of the chamber may have a threshold, over which a specially constructed cart/cage combination may be wheeled into the chamber cavity. The bottom of the door may therefore have an inflatable seal that may seal against the bottom of the door with respect to the threshold and the other door seal(s). A door latch is usable to secure the door in the closed position, and an electro-magnetic lock may additionally guard against unintentionally opening of the door during the process. A proximity switch may detect proper positioning of the cage/cart combination within the chamber, and one or more additional sensors may be used for verifying that the door is closed and locked.

A supply valve may control the flow of a euthanizing gas into the chamber, which may be heated by a heater to suitable temperatures. The supply valve may operate in conjunction with a fan and damper secured in a fresh air exhaust opening in the chamber that may simultaneously permit the outflow of fresh air to prevent over-pressurization, which may otherwise cause distress to the animals therein. To safely access the cart/cage combination and facilitate its removal after the process has been completed, a fan and a damper secured within an exhaust gas opening in the chamber, and a damper secured within a fresh air inlet opening may work in conjunction to duct the toxic gas out of the chamber and be replaced with fresh air. The valves and damper may each be electromagnetically actuated using a solenoid.

Electrical power to the device may be controlled by a keyed selector switch, and automation of the process may be overseen through the use of a programmable logic controller and a human machine interface (HMI), which may include a touch screen permitting adjustments to various set points in the procedure, for different species of animals (e.g., gas flow rates, concentrations of the euthanizing gas to induce narcosis, holding times, etc.). An emergency handle on the interior of the chamber may initiate immediate cessation of the introduction of gas into the chamber, and trigger the introduction of fresh air therein, as well as the unlocking of the chamber door.

Oxygen sensors may be used for monitoring the concentration of euthanizing gas in the chamber, which may, for example, be CO2. (Note that the use of CO2 hereinafter is not intended to limit the possible choices of euthanizing gas that may be usable with the apparatus of the present invention, and is merely used to be exemplary). The concentration of the euthanizing gas within the chamber that is detected by the oxygen sensors may enable the PLC to precisely cease the flow of CO2 upon reaching a concentration needed to produce unconsciousness in the animal(s). A translucent observation window fixedly secured in one of the walls of the chamber may be used to verify unconsciousness. Subsequently, the concentration of gas may be increased to a level toxic for the particular animal(s).

The cart-cage combination may be specially constructed to permit the animals to be housed and raised therein, and may include water supply lines, and access areas for trays to gather feces for lab analysis and research. A complete life-cycle for the particular animals may occur within the cart/cage combination, including euthanization in the chamber, at the end of successful experimentation.

BRIEF DESCRIPTION OF THE DRAWINGS

FIG. 2 is a front view of the improved euthanasia apparatus of the present invention, with the cart/cage combination properly positioned therein.

FIG. 2A is a view of the front wall of the improved euthanasia apparatus of FIG. 2, showing interior details.

FIG. 3 is a side view of the improved euthanasia apparatus of FIG. 2.

FIG. 3A is a side view of the improved euthanasia apparatus of FIG. 2, showing interior details.

FIG. 4 is a rear view of the improved euthanasia apparatus of FIG. 2, showing the cart/cage combination therein.

FIG. 4A is a rear view of improved euthanasia apparatus of FIG. 2, showing interior details.

FIG. 5 is a top view of the improved euthanasia apparatus of FIG. 2.

FIG. 5A is a top view of the improved euthanasia apparatus of FIG. 2, showing interior details.

FIG. 5B is an enlarged detail view of the door and threshold of FIG. 5A.

FIG. 5C is a section cut through the door bottom showing the inflatable seal therein.

FIG. 7A is a front view of a cart/cage combination that is usable with the improved euthanasia apparatus of FIG. 2, FIG. 7B is a first side view of the cart/cage combination of FIG. 7A.

FIG. 7C is a rear view of the cart/cage combination of FIG. 7A.

FIG. 7D is a second side view of the cart/cage combination of FIG. 7A,

FIG. 7E is a top view of the cart/cage combination of FIG. 7A.

FIG. 13 shows a front view of an alternate embodiment of the improved euthanasia apparatus of the present invention, shown with the cage removed from the chamber.

FIG. 14 is a side view of the improved euthanasia apparatus of FIG. 13.

FIG. 15 is a rear view of the improved euthanasia apparatus of FIG. 13.

FIG. 16 is a top view of the improved euthanasia apparatus of FIG. 13.

DETAILED DESCRIPTION OF THE INVENTION

Figure 1:
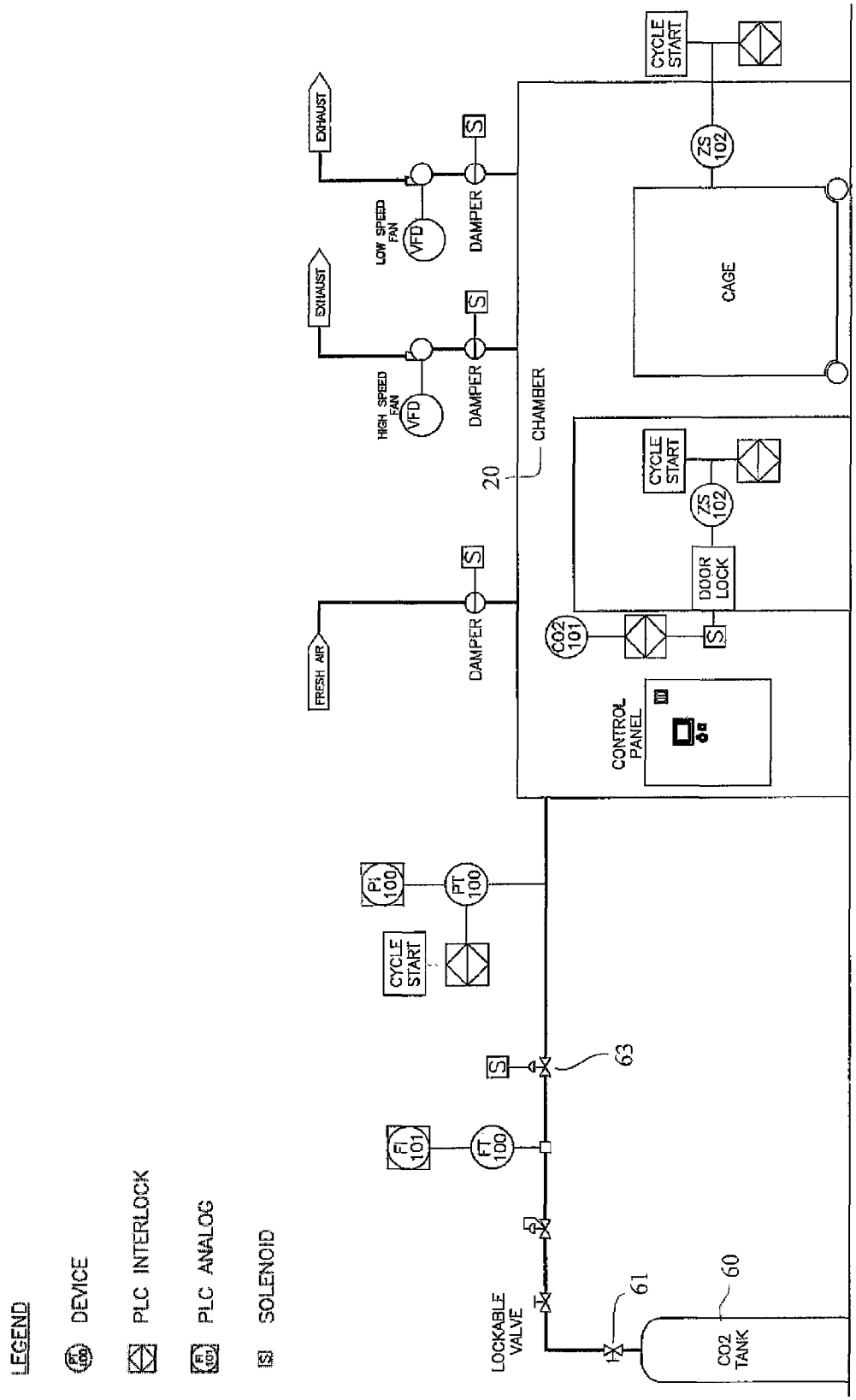
FIG. 1 is a piping and instrumentation diagram representing the apparatus of the present invention.

FIG. 1 shows a piping and instrumentation diagram for the improved animal euthanasia apparatus 10 of the current invention, while FIGS. 2-5 show orthogonal views of the device. As seen in FIG. 2 and in the enlarged view of FIG. 6, the device may preferably be constructed of sufficient dimensions to accommodate euthanizing of a single large animal—perhaps one being as large as, or even larger than a man, and may thus also accommodate simultaneous euthanizing of many smaller animals. Scaling of the invention to be larger or smaller is readily accomplished, as seen in the following discussion.

The improved animal euthanasia apparatus 10 may include a chamber 20. The chamber 20 may be formed in one of several different ways. The chamber may be formed of a plastic material that may be compatible with the euthanizing gas that is to be inhaled by the animals. For example, where the euthanizing gas is carbon dioxide ($CO_2$), material compatibility is found with such plastics as: Kel-F type Neoflon M 400H, polychlorotrifluorethyene (PCTFE); Polytetrafluoroethylene (PTFE) such as the brand by DuPont Co. known as Teflon; ethylene-tetrafluoroethylene modified copolymer (ETFE) which is often referred to by DuPont's trade name Tefzel®; and KYNAR. It may thus be possible to form the chamber into any desired shape, including an irregular shape. As it may be useful to load animal cages therein, which is discussed hereinafter, the chamber may be more efficient when formed to be generally box-shaped, and may thus be a six-sided or faceted enclosure. This form of enclosure for the chamber 20 may therefore be a single continuous wall member with contouring between the faceted sides.

Many metallic materials are also compatible with $CO_2$ and other euthanizing gases, such as copper, zinc, aluminum, brass, monel, and stainless steel. Therefore, the chamber 20 may also be built using one of these metallic materials, which may lend itself to being formed using discreetly different numbers of wall sections. For example, a first continuous wall section may be formed with four sides, with the ends being mechanically joined together, and a second continuous wall section may be similarly formed, with the pair of four sided wall sections being nested together and mechanically joined using suitable fasteners to form a box. Alternatively, rather than using combinations of multiple-faceted wall sections, individual walls may be separately formed and joined to form a cavity in chamber 20, including, as seen in FIG. 2, a front wall 21, a first side wall 22, a rear wall 23, a second side wall 24, a floor 25, and a roof wall 26. Any suitable stiffener arrangement may be utilized to support the walls, which may be formed of sheet metal, and which may, for strength and other considerations, be formed using a suitable austenitic stainless steel. Each of the mechanically fastened joints may be further sealed to prevent leakage of the gas therethrough. These seams may each be caulked with a caulking material, including, but not limited to, silicone.

Figure 17:
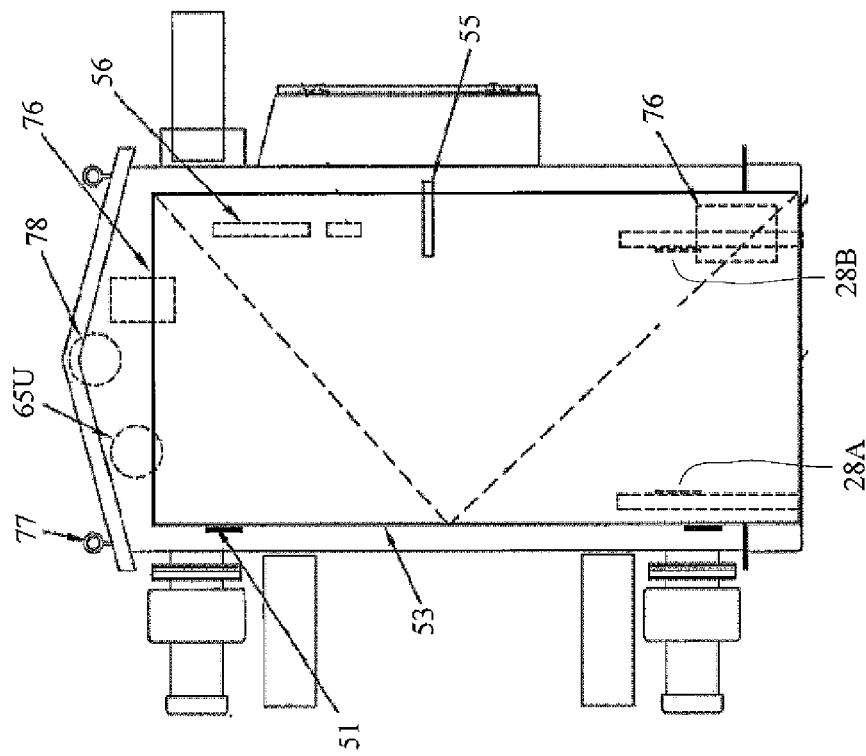
FIG. 17 is a side view of a third embodiment of the improved euthanasia apparatus of the present invention, shown with the door closed.

The first side wall 22 may include an opening having a periphery 22P (FIG. 3), which may be sealed by a door 50. The door 50 may be mounted to the first side wall 22 through the use of one or more hinges 51, to enable it to be pivotable with respect to the chamber 20, and movable between an open position (FIG. 5) and a closed position (FIG. 2). The chamber floor 25 may transition at the opening periphery 22P into a threshold 25T, which may be configured to permit the wheel or wheels of a cart to roll from the adjacent floor area 5 across threshold 25T, to thereby enter the interior of chamber 20. This arrangement permits the operators of the improved animal euthanasia apparatus 10 to utilize a wheeled cart/cage combination 100 for convenient placement of the animals to be euthanized within the device. One example of such a cage/cart combination 100 is shown within FIGS. 7A-7E. The cage/cart combination 100 may utilize a single wheel being rotatably mounted to a bottom of the cart, which may be lifted by the operator and steered in through the opening of the chamber, much like a wheelbarrow, and which may be assisted by the cage rail guides 28A and 28B that may be secured to the interior of the front and rear walls 21/23 of the chamber, as seen in FIG. 17. Alternatively, the cage/cart combination 100 may utilize four wheels 101, which may be swivel casters to easily allow for its manipulation into and out from the chamber 20. The cage/cart combination 100 may have a frame 102, around which one or more cages may be integrally built/assembled. For example, the cage/cart combination 100 in FIGS. 7A-7E is specifically constructed to house and raise birds, after which they will be terminated, and so the cage/cart combination is specifically designed to work together with the improved animal euthanasia apparatus 10. The cage/cart combination 100 may be partitioned into six separate cages (103A-103F), each of which may have a separate opening with a corresponding cage access door, a separate water cup with leveler valve 104, and an open space below the cage to receive a tray usable for the collection of feces that may be routinely analyzed. Rather than having cages integrally constructed with the cart, separately assembled cages may simply be placed on shelves of the cart, or they may be stacked upon each other. Note that in one embodiment of the cage/cart combination 100, its construction may be such that the bottom-most cage(s) may be positioned above the ground floor area 5 at a height being sufficient to avoid being quickly engulfed by the euthanizing gas, prior to the animal therein being permitted to be rendered unconscious, which is discussed hereinafter.

In an alternate embodiment of the invention, a second door 50' may be similarly installed upon wall 24 to seal an opening therein, with its inflatable seal sealing against a second threshold. With this arrangement, as may be understood from the top view of FIG. 5, the process may be better adapted for processing of large numbers of animals housing in different cart/cage combinations, whereby a first cart/cage may be wheeled in one door of the apparatus, both doors may be closed and sealed, and the euthanasia process conducted, and then the first cart/cage with carcasses therein may be wheeled out the second door, while another cart/cage is loaded into the chamber 20' through the first door. This also makes for easier maneuvering of the cart/cage, as the casters do not need to be jockeyed to reverse the direction of movement of the cart/cage combination currently in the chamber 20 to accomplish its removal therefrom.

A manually operated door handle/latch 55 may be used so that the door may remain secured across and/or within the opening—in the closed position—during the procedure. The latch may be a push-to-close, door face-mount latch with an emergency release handle, which is available online from McMaster-Carr. An electro-magnetic lock 56 (FIG. 6B) may furthermore be used in addition to the latch 55, to protect against inadvertent opening of the door 50 when the chamber 20 is being utilized for euthanizing of animals with toxic gas. Lock 56 may be one of the M400 high security series of electro-magnetic locks made by Schlage®.

Secured to the first side wall 22, around the opening periphery 22P, may be a seal 53. The seal 53 may be one continuous seal member that may begin on one side of the opening periphery 22P proximate to the threshold, and may span across the top of the opening, and may run down the other side of the opening periphery to terminate at a position that is also proximate to the threshold (see FIG. 5B). Seal 53 may be a push-on type edge seal member, such as the one shown in FIG. 5D, which may be manufactured from buna-N rubber, and which is available from McMaster-Carr, in Los Angeles, Calif. Alternatively, the seal may be a plain elastomeric seal that is received in a groove on the face of the wall, or it may be any other suitable seal type/arrangement known in the art. When the door 50 is closed and secured using latch 55, it may engage the seal 53 to seal the chamber, except at the threshold 25T, which, being configured to accommodate the rolling of a wheeled cart/cage combination thereon, is not adapted for such sealing. Therefore, door 50 is particularly configured to include an inflatable seal on the bottom of the door.

FIG. 5C shows a cross-sectional view through the bottom of the door 50. Inflatable seal 54 may be configured to seal the door 50 with respect to the threshold 25T, and with respect to the two ends of the door edge seal 53, where its ends terminate proximate to the threshold, to thereby generally seal the chamber, when the door is closed and latched, against unintended fluid communication with the surrounding environment. Inflatable seal 54 may be supported within a seal housing 54H, and may be in fluid communication with a valve and a pump, to thereby permit selective inflation/deflation of the inflatable seal during the process of euthanizing the animals. The pump may also be used to power pneumatic actuators used on the apparatus. Instead of an integral pump and valve, the inflatable seal may be in fluid communication with a port that may be coupled to a source of compressed air that is located at the facility that will utilize the apparatus 10. The inflatable seal may be made of a number of different materials, including, but not limited to, silicone. A door brush 52 may be secured to the bottom of the door 50 at its back edge, as seen in FIG. 5B, and may include a series of bristles that may sweep the threshold to be clear of any dirt or debris that could hinder the integrity of the sealing thereon by the inflatable seal 54.

Figure 18:
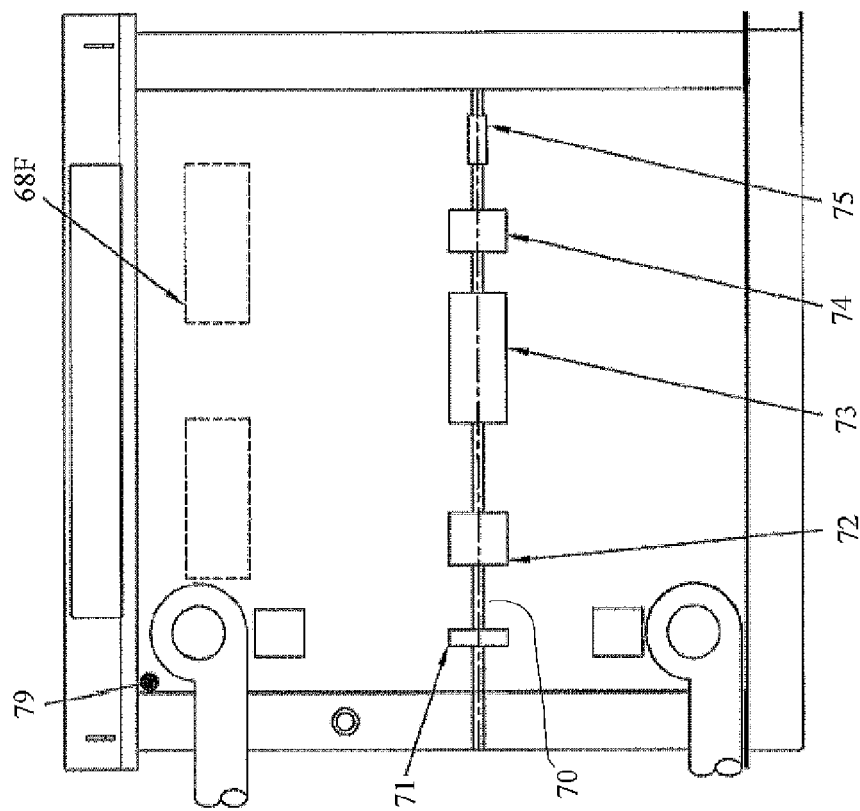
FIG. 18 is a rear view of the improved euthanasia apparatus of FIG. 17.
Figure 19:
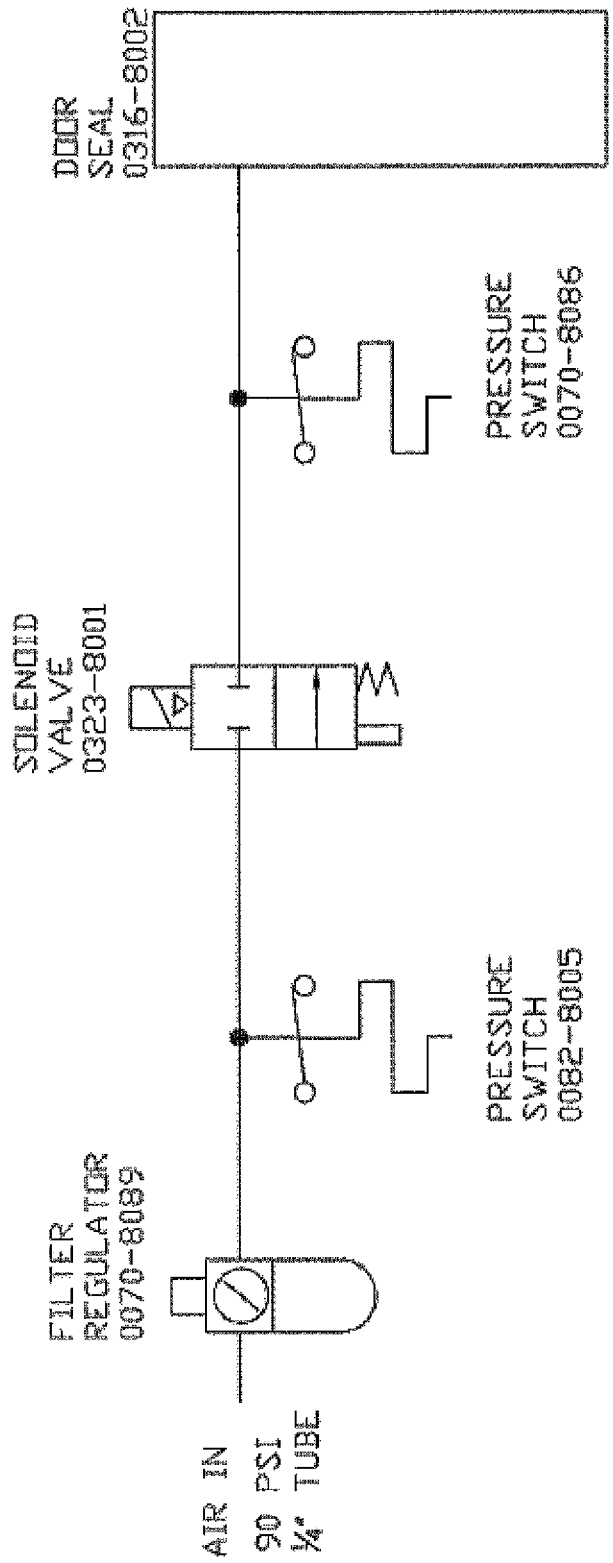
FIG. 19 is a pneumatic schematic for the inflatable seal of the door of the present invention.
Figure 20:
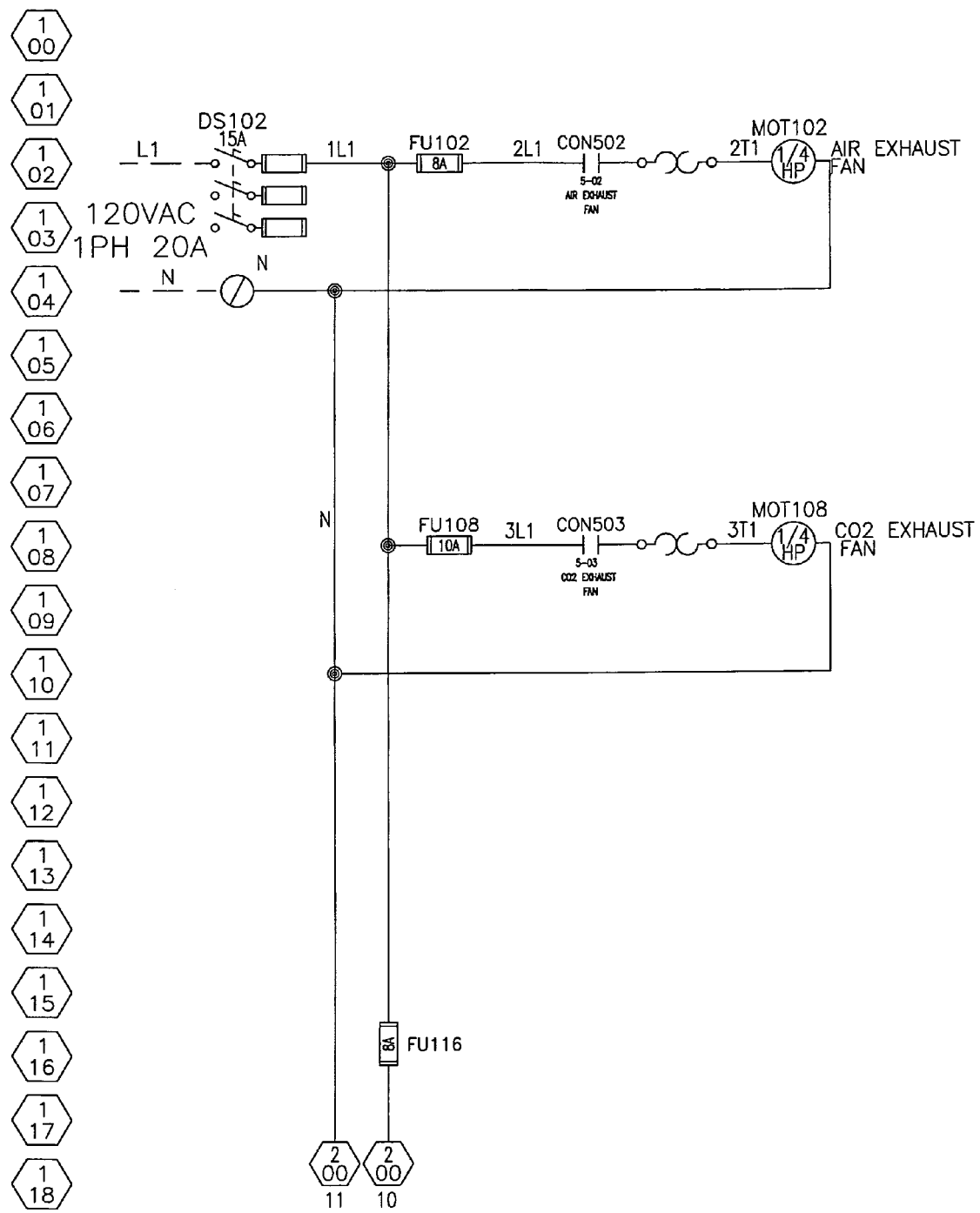
FIG. 20 is a first electrical schematic including the air exhaust fan and the CO2 exhaust fan.
Figure 21A:
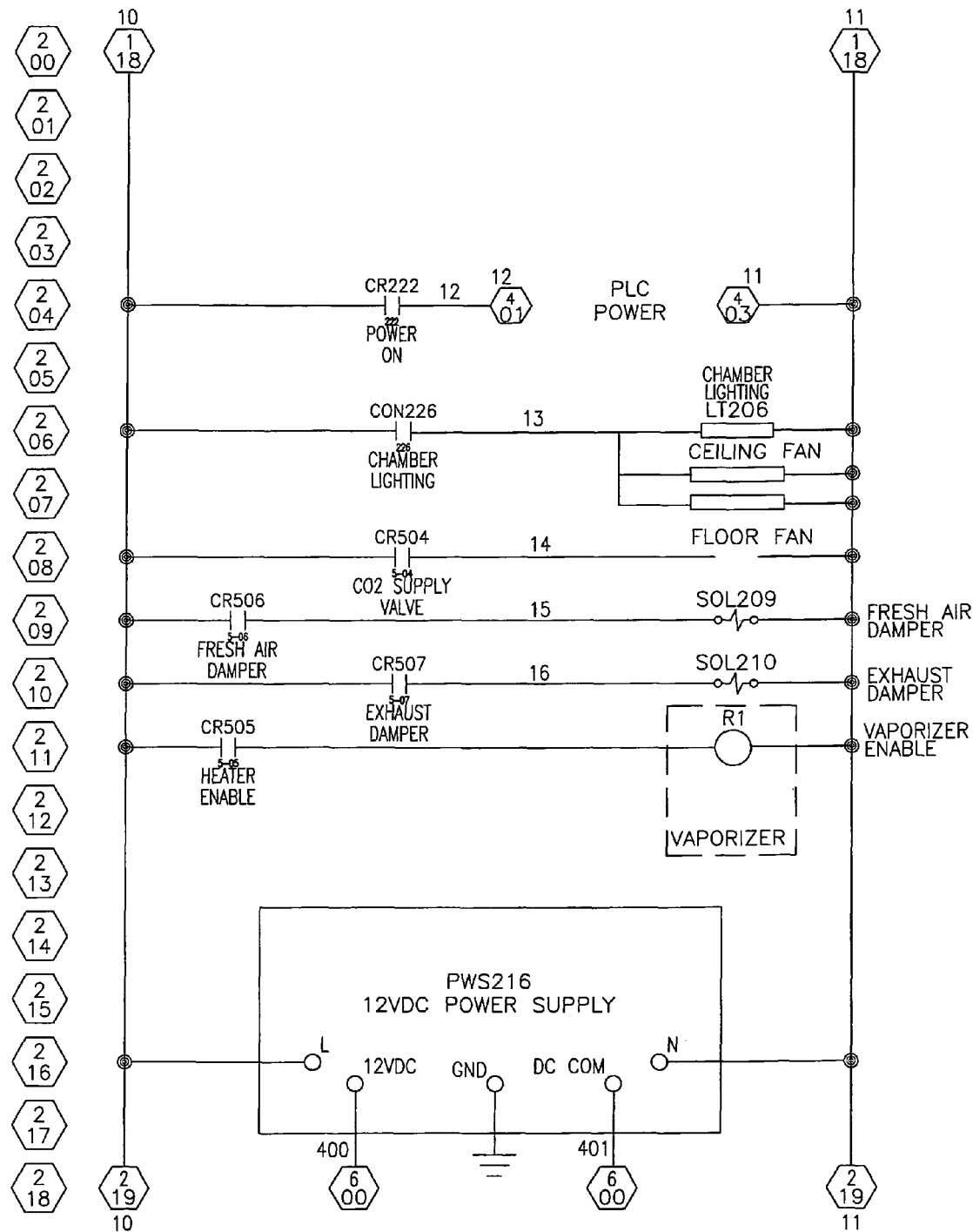
FIG. 21A is a second electrical schematic including the power supply.
Figure 21B:
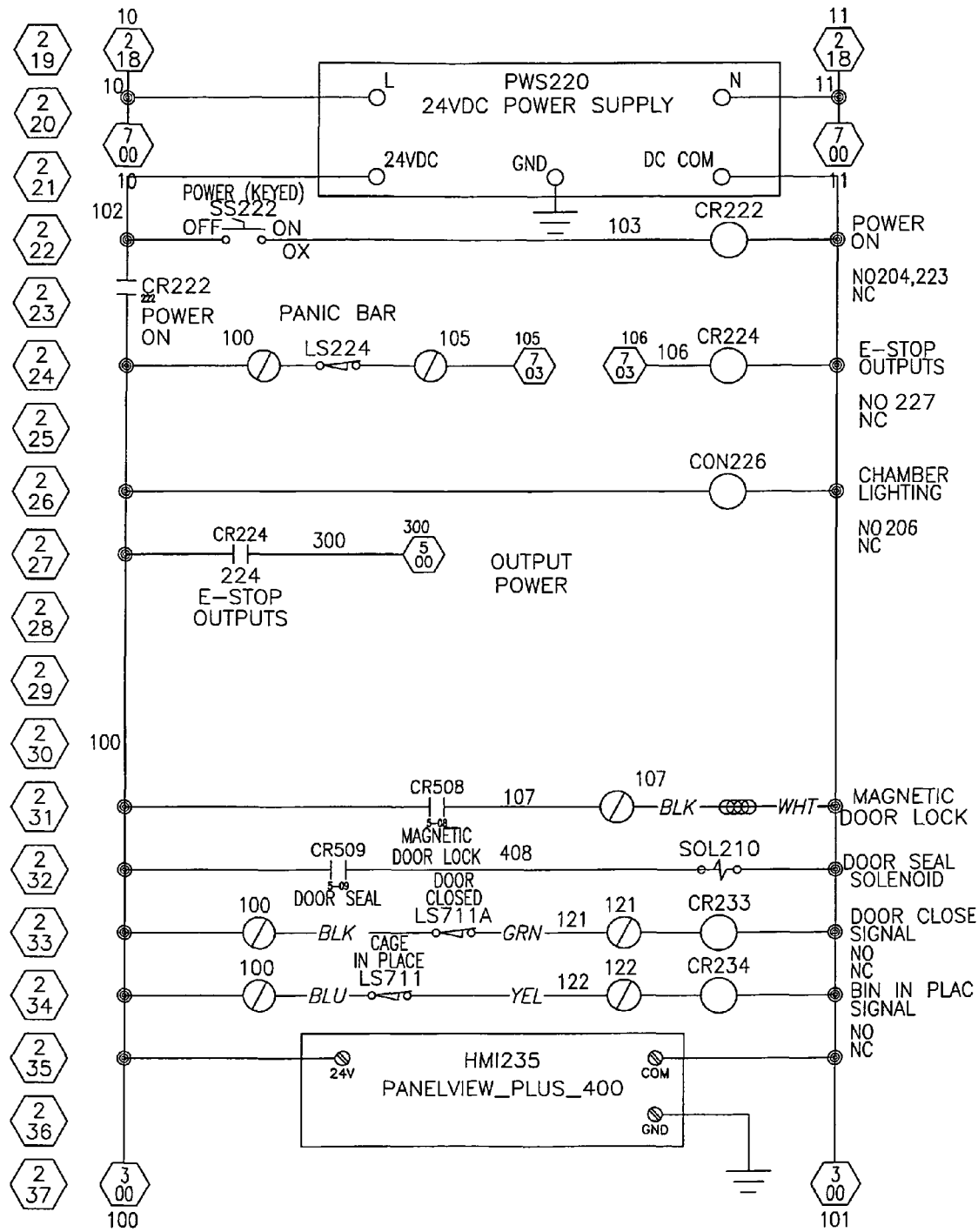
FIG. 21B is a third electrical schematic, which includes the HMI (PanelView plus) device.
Figure 22A:
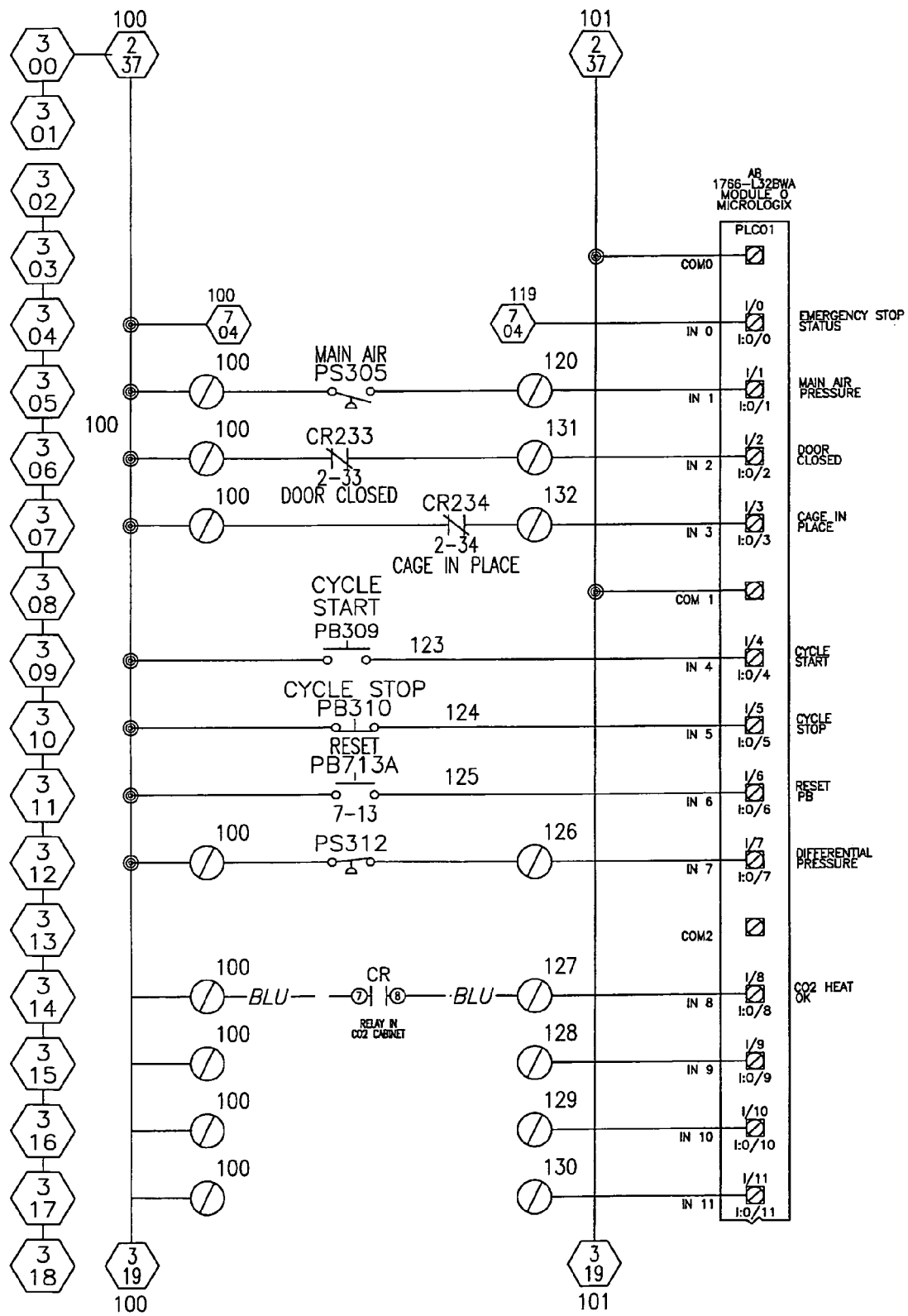
FIG. 22A is a fourth electrical schematic, which includes the MicroLogix® programmable logic controller.
Figure 22B:
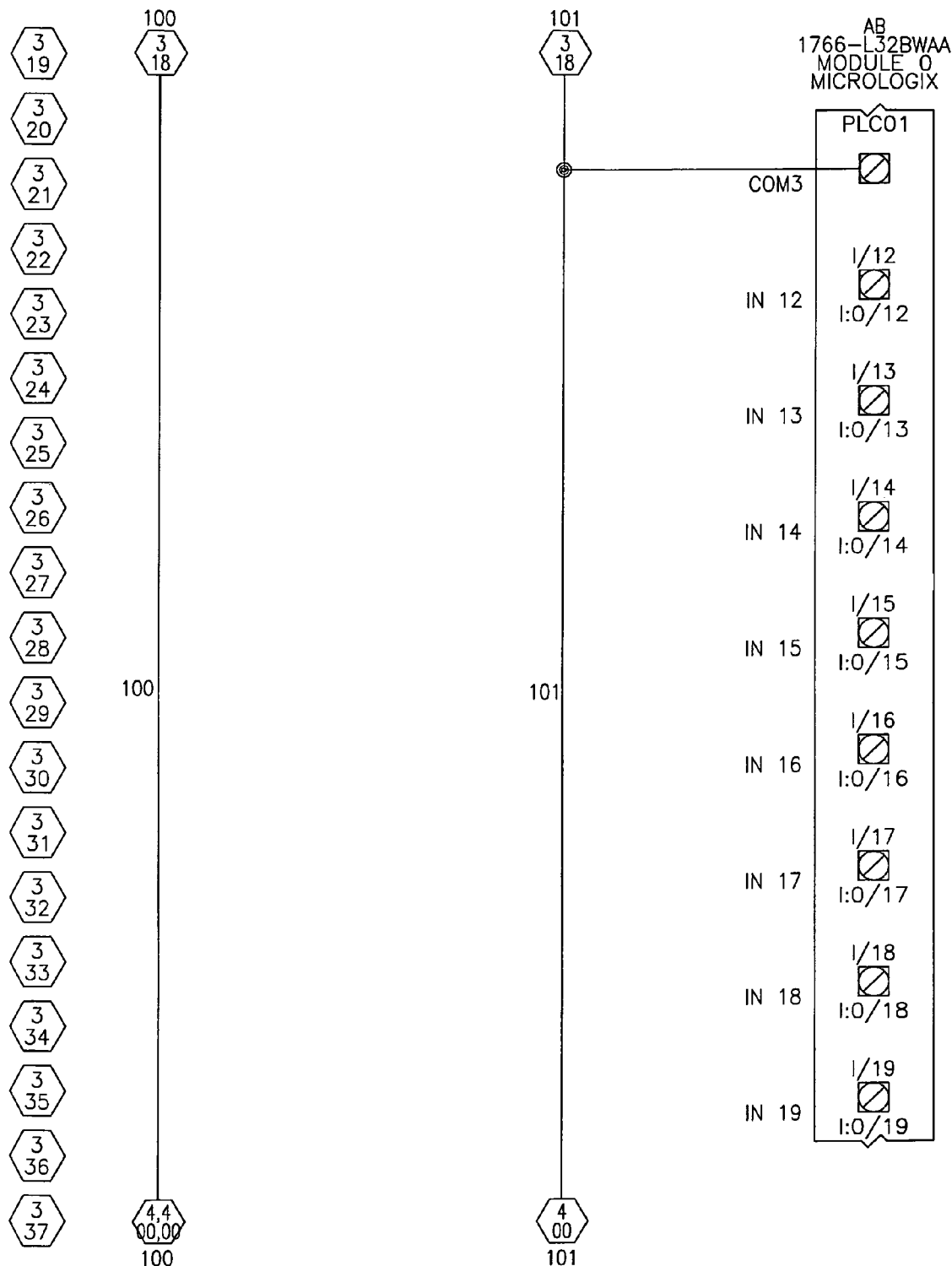
FIG. 22B is a fifth electrical schematic, which also includes the MicroLogixe_progammable logic controller.
Figure 23A:
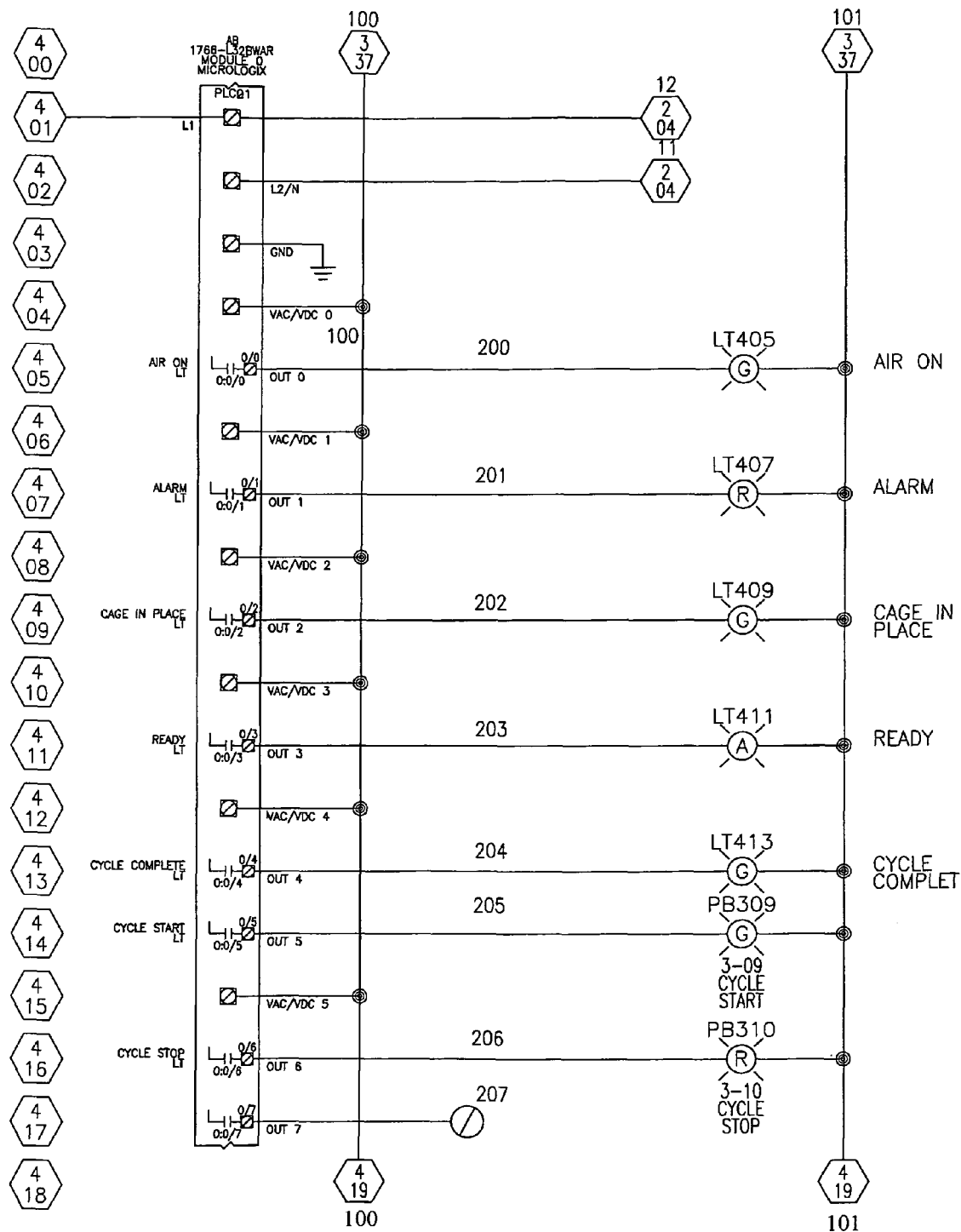
FIG. 23A is a sixth electrical schematic which also includes the MicroLogix® programmable logic controller.
Figure 23B:
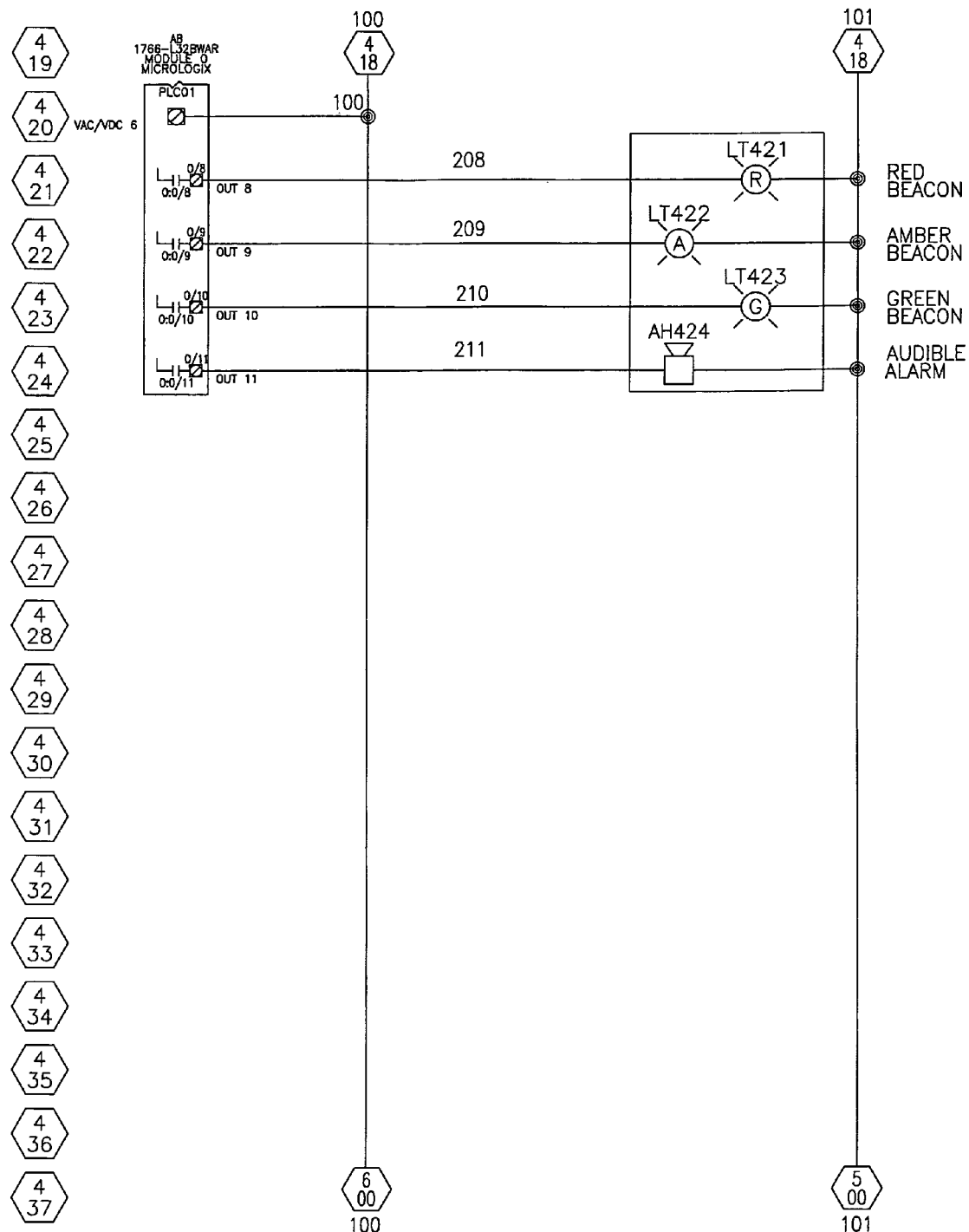
FIG. 23B is a seventh electrical schematic which also includes the MicroLogix® programmable logic controller.
Figure 24:
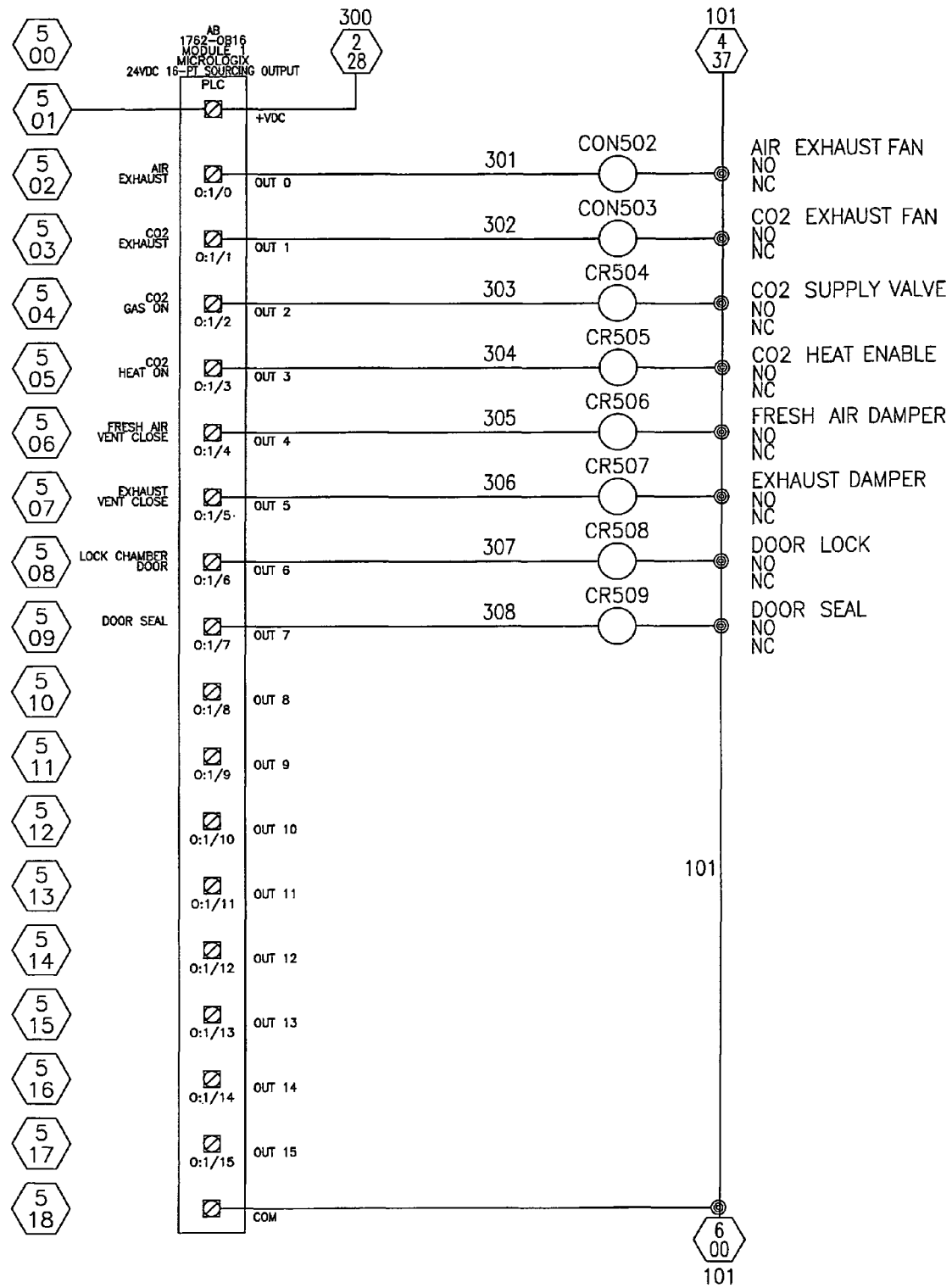
FIG. 24 is an eighth electrical schematic which also includes the MicroLogix® programmable logic controller.
Figure 25:
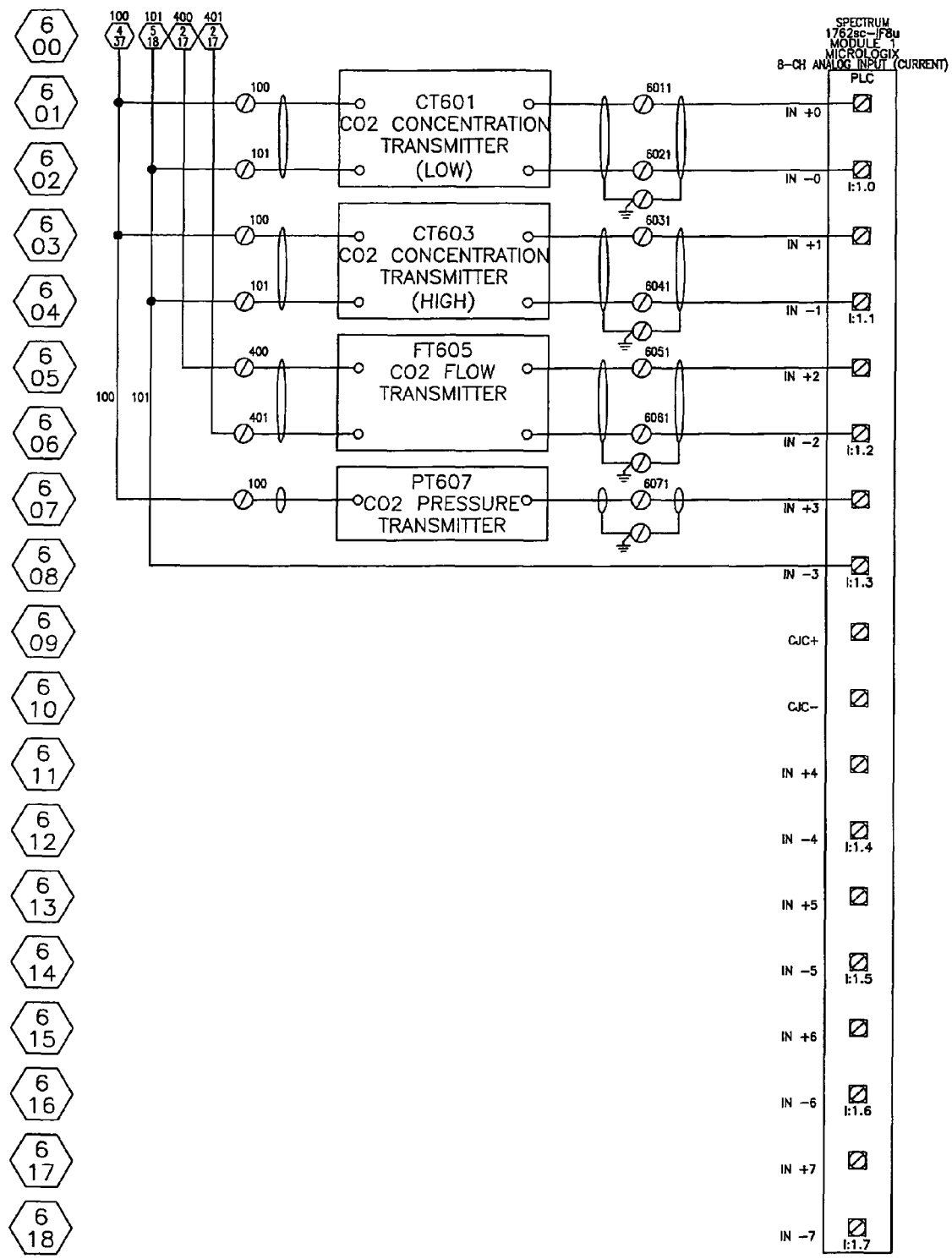
FIG. 25 is a ninth electrical schematic, which includes the CO2 flow meter, pressure and concentration sensors.
Figure 26:
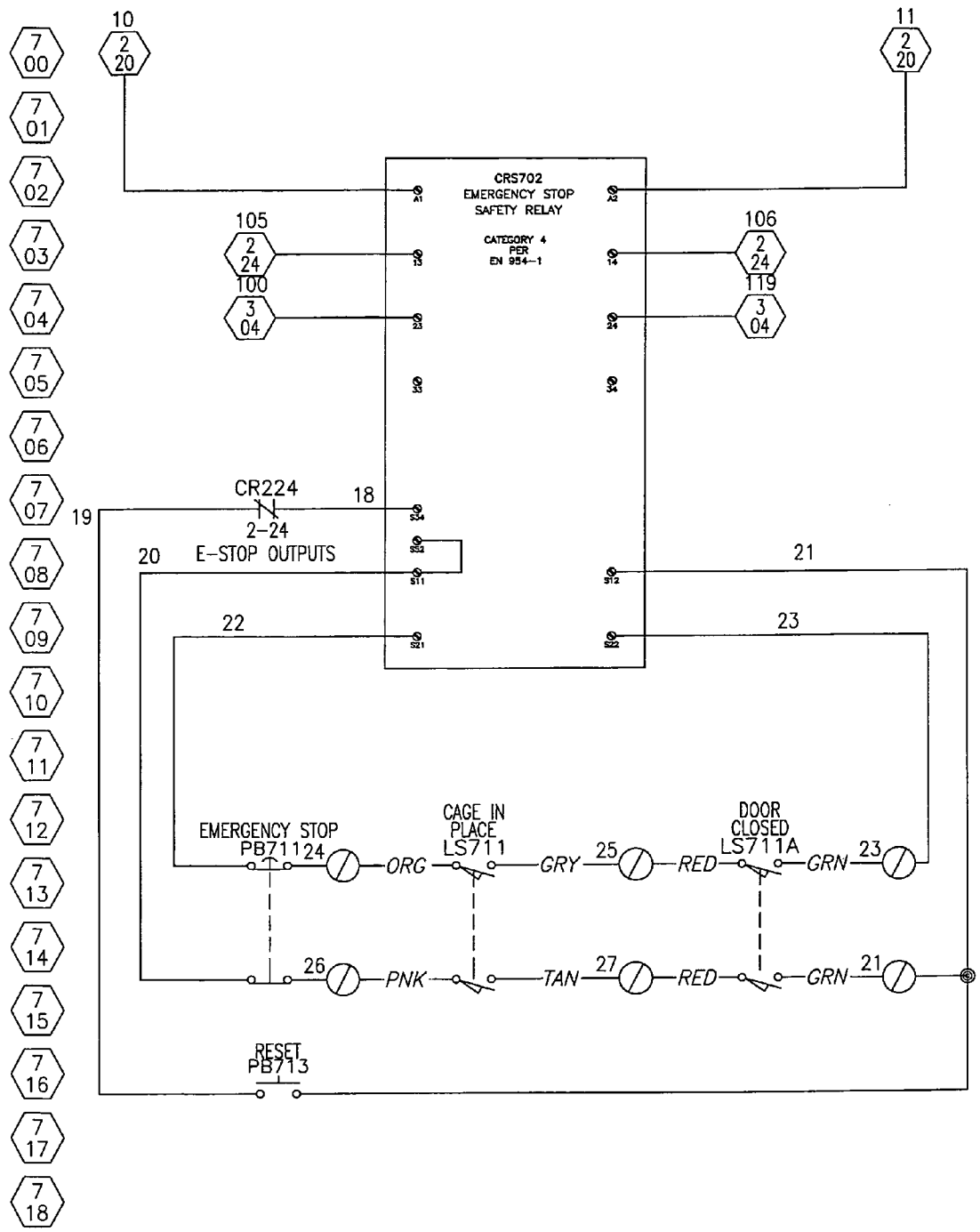
FIG. 26 is a tenth electrical schematic, which includes an emergency stop device.

To enable functioning of the improved animal euthanasia apparatus 10 of the current invention, the chamber 20 may have a series of ports that are particularly configured for fluid transfer in to or out from the chamber, which is generally illustrated within the piping and instrumentation diagram of FIG. 1. The chamber 20 may include a euthanizing gas supply valve in one of the walls, or instead, the chamber may have a pipe that is in fluid communication therewith, where the pipe has a supply valve to control the flow of euthanizing gas into the chamber. The pipe may connect to a supply of euthanizing gas, such as the tank 60 of CO2 seen in FIG. 1, which may have its own shut-off valve 61 thereon to control flow of the gas therefrom. The supply valve 63 may be a pilot operated solenoid valve, which may be obtained from Asco Valve, Inc., in Florham Park, N.J. (e.g., ASCO Red Hat 2/2 series 8210). A heater may be used to heat the flow from the tank, to ensure that a gas is introduced, and not a liquid or a liquid with ice having formed therein, and to furthermore introduce the gas at a temperature set point sufficient to prevent discomfort to the animals. The supply of euthanizing gas from the chamber supply valve 63 may be distributed within the chamber 20 using a manifold 70, as seen in FIG. 3A, and/or by using an upper circulation fan 65IJ or a floor fan 65L, as seen in FIG. 15. The manifold 70 may include, as seen in FIGS. 15 and 18, a pressure transducer 71, a solenoid valve 72, a mass flow meter 73, a high purity gas regulator 74, and an on/off ball valve 75. The ball valve may serve as a manual override with lock out capability for the gas flow. The high purity regulator may control the incoming pressure of the CO2, while the solenoid may just turn the delivery on and off.

Admission of euthanizing gas into the sealed chamber 20 to occur without a corresponding pressure increase—an effect that might unnecessarily cause discomfort to the animals within the chamber—requires a port that is adapted for accomplishing removal of the fresh air therein. As seen in FIGS. 3 and 5, the improved animal euthanasia apparatus 10 may include a fresh air exhaust fan and damper 66, which may be positioned on an upper part of the rear wall 23 of chamber 20, or which may be positioned elsewhere, including the roof 26 of the apparatus. The damper may be used to open and to close the port to correspondingly permit or prevent fresh air flow through the opening, and the fan may accelerate the removal of fresh air when the fresh air exhaust damper is opened. The introduction of euthanizing gas through the chamber supply valve 63 and the expulsion of the fresh air using the fresh air exhaust fan and damper 66 may be coordinated during the process. (Note—a pressure relief valve 79 may also be incorporated into one of the walls of the chamber 20, as seen in FIG. 18).

After the animals have been successfully euthanized, which is discussed further hereinafter, the lethal gas contained within the chamber 20 must be properly expelled before the operator of the device may open the door to be able to safely proceed with the removal of the cage/cart combination and the carcasses therein. To accomplish expulsion of the CO2 or other noxious gas, the chamber 20 may include one or more openings that may each receive an exhaust gas fan and damper combination 67, which may be positioned on a lower part of the chamber wall (FIG. 3). The exhaust openings may be interconnected within the interior of the chamber using an exhaust duct 67D, which may have a replaceable exhaust filter 67F therein, for filtering the air that is removed from the chamber 20 (e.g., FIG. 3A).

Figure 5D:
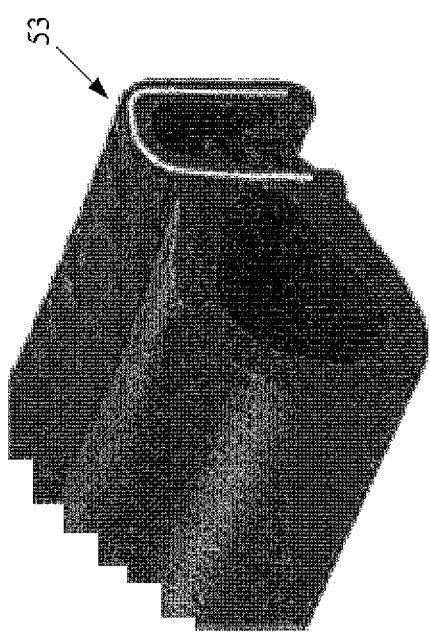
FIG. 5D is a perspective view of one embodiment of a seal, usable around the periphery of the chamber opening.
Figure 5E:
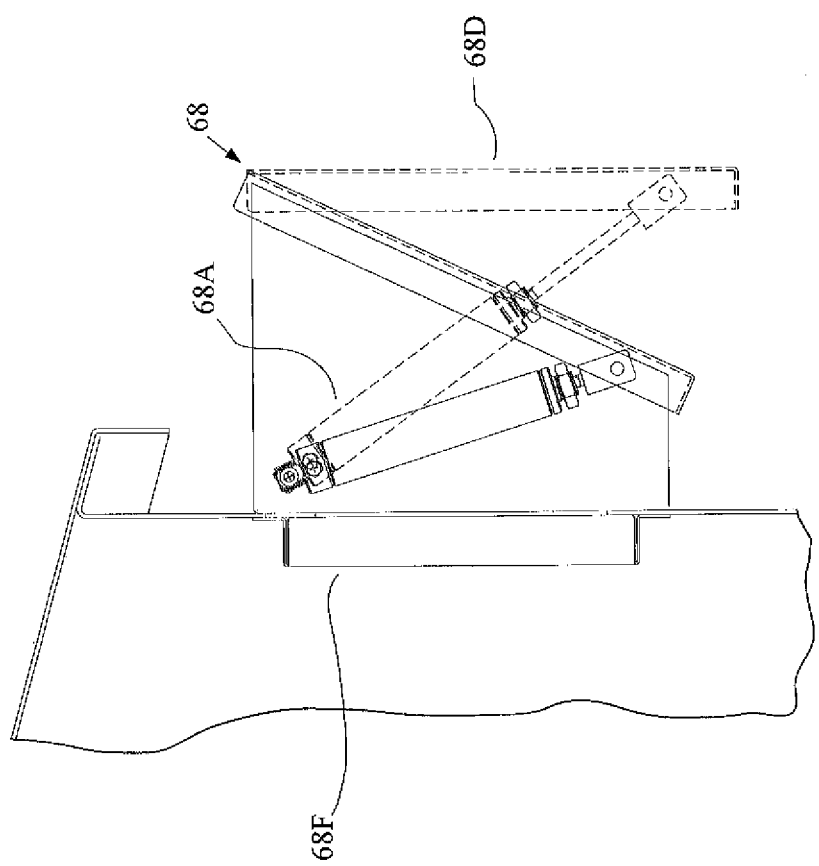
FIG. 5E is an enlarged detail view of the fresh air inlet and damper of FIG. 5A.
Figure 6A:
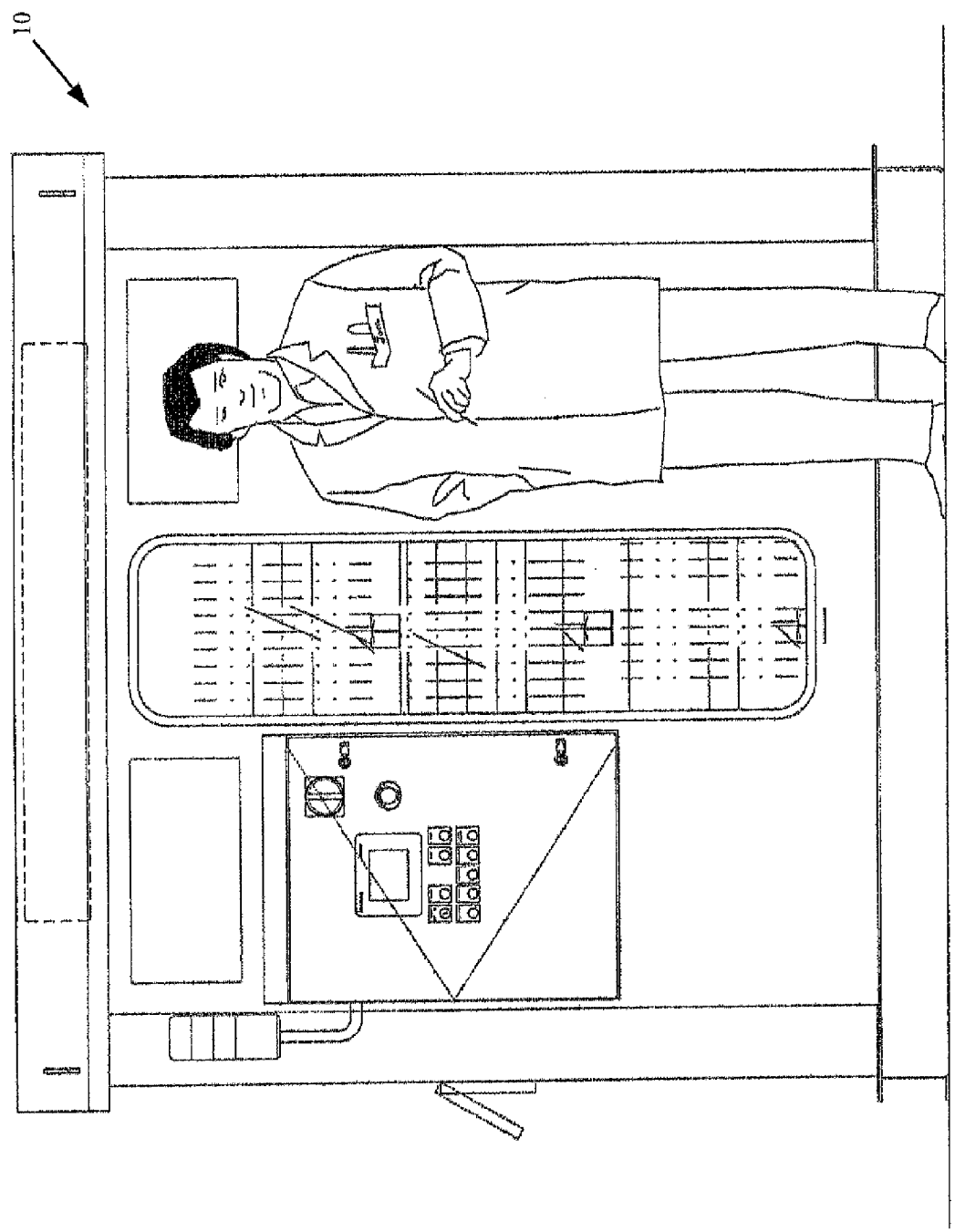
FIG. 6A is the front view of FIG. 2 shown enlarged.
Figure 6B:
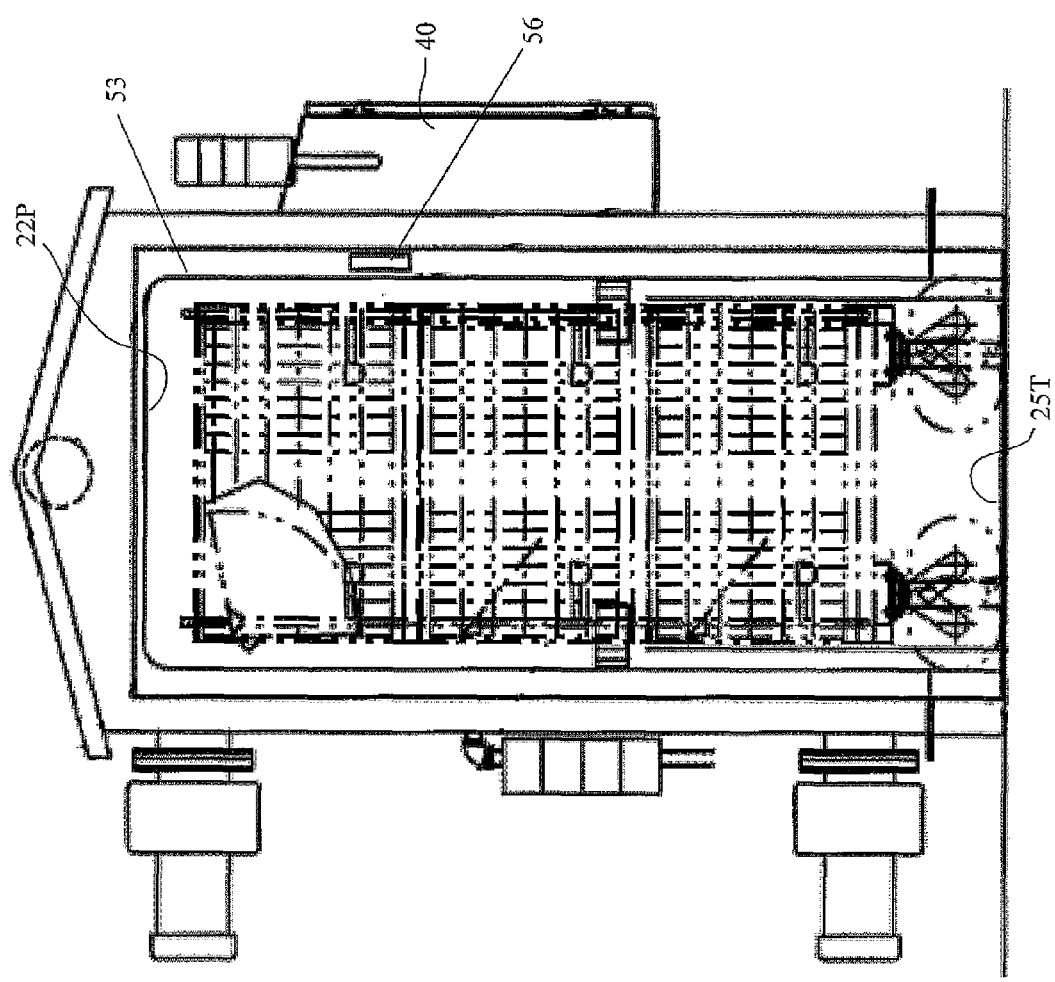
FIG. 6B is the side view of FIG. 3 shown enlarged.
Figure 8:
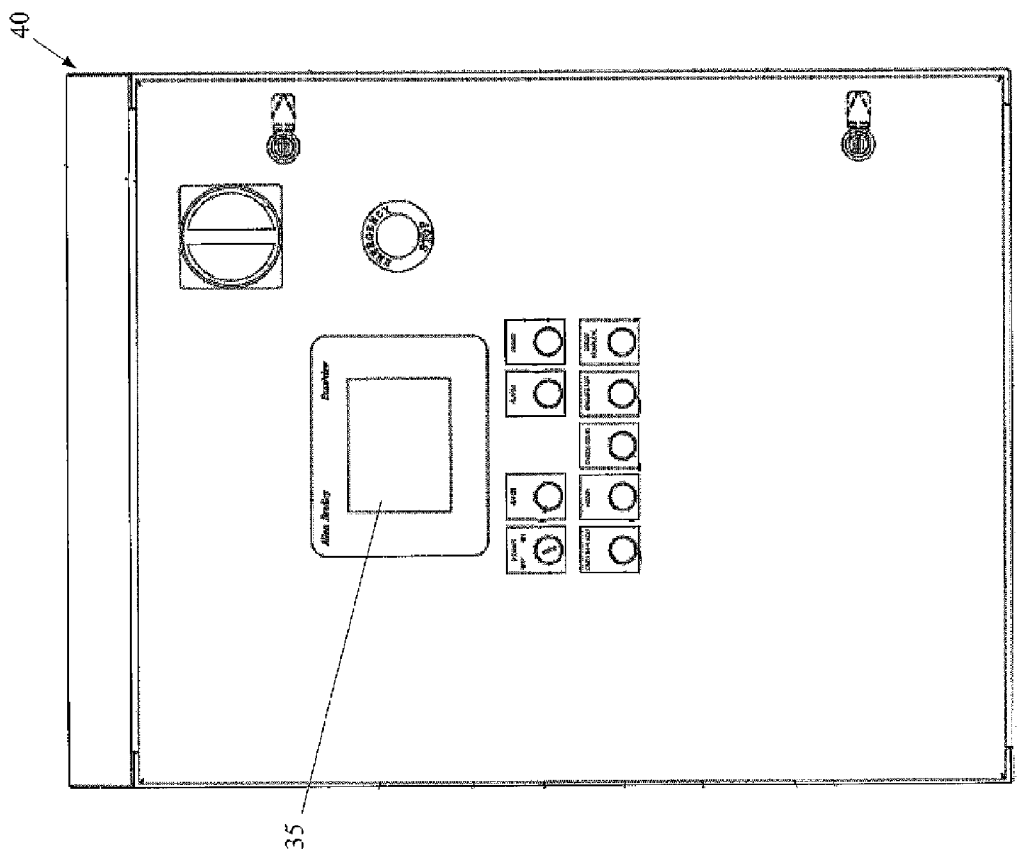
FIG. 8 is an enlarged front view of the electrical panel of the improved euthanasia apparatus of FIG. 2.
Figure 9:
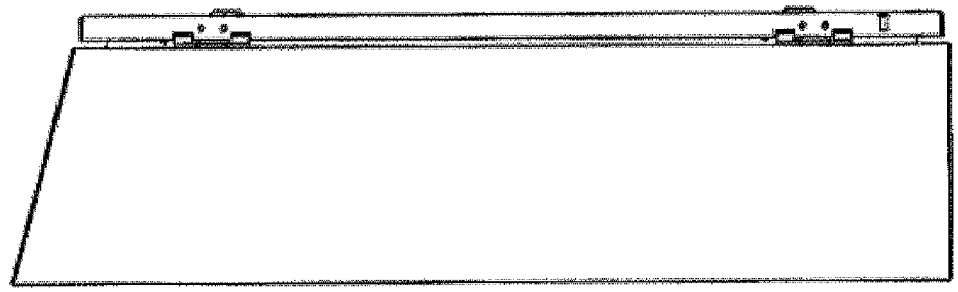
FIG. 9 is a side view of the electrical panel of FIG. 8.

To avoid creating a vacuum within the sealed chamber during the evacuation of the CO2, the chamber may also include one or more fresh air inlet openings and corresponding dampers 68. The damper(s) may be manually opened and closed. Alternatively, any of the dampers disclosed herein may be mechanically actuated, where a hydraulic or pneumatic actuator may be configured to open and close a damper door. Instead of the hydraulic or pneumatic actuator, an electro-mechanical solenoid 68A may be used to actuate the damper, as seen in FIG. 5E. The interior side of the damper may include a replaceable filter 68F, which may also be seen in FIG. 2A. Each of the fresh air inlet openings and corresponding dampers 68 may have a corresponding fan to assist in the admission of fresh air through the opening(s)—air which may otherwise be drawn into the chamber as a result of the evacuation of the euthanizing gas by the exhaust gas fan. These fresh air fan(s) may also be manually turned on and off, or may be signaled to turn on/off as part of an automated euthanasia process. The exhausting of euthanizing gas using the exhaust gas fan and damper combination 67, and the opening of the damper(s) for the fresh air inlet openings may be coordinated during the process to preclude creating a vacuum, which may cause an excessive load on the exhaust gas fans. The exhaust gas may preferably be ducted to the exterior of the facility or to a holding tank.

Figure 10:
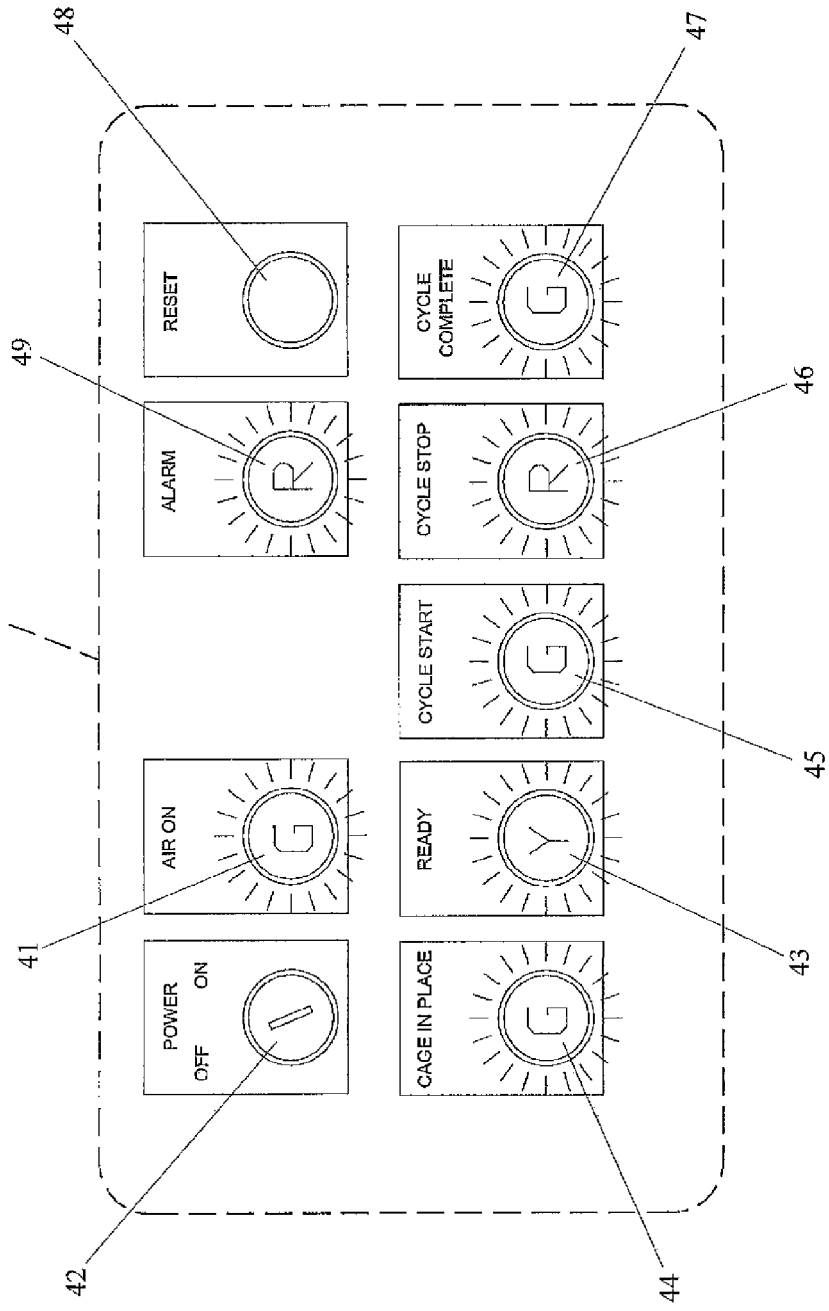
FIG. 10 is an enlarged detail view of the indicator lights and switches on the electrical panel of FIG. 8.
Figure 11:
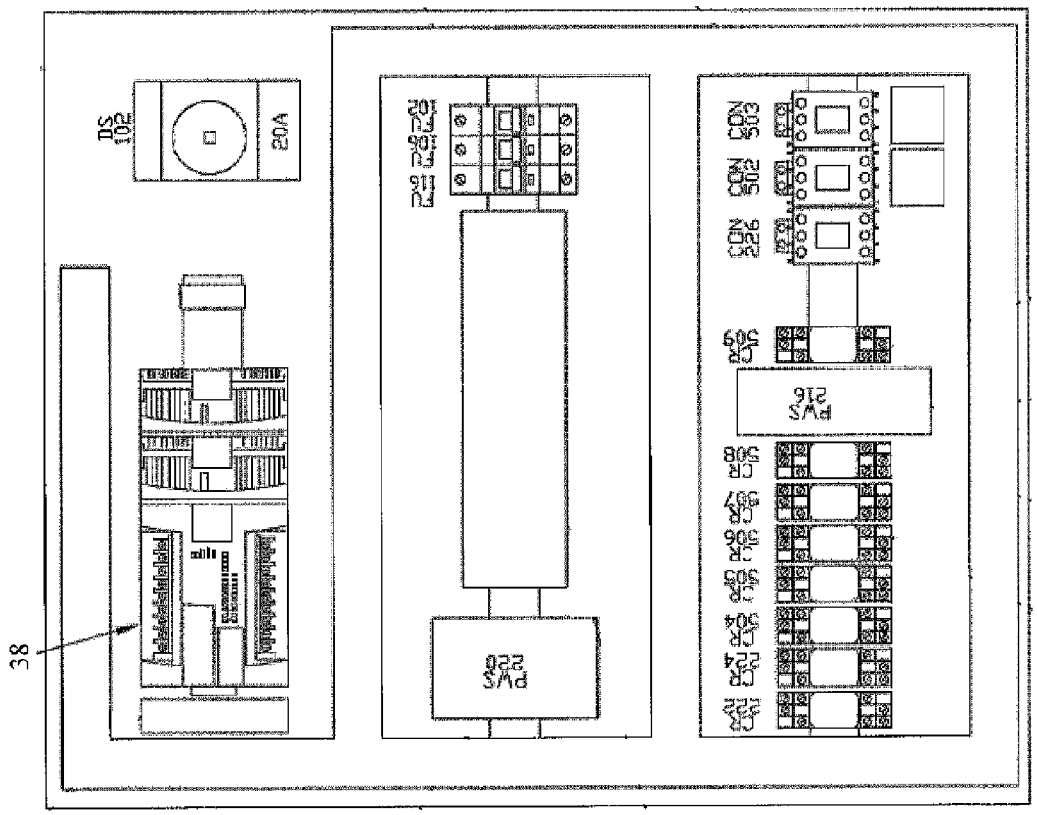
FIG. 11 is a rear view of the electrical panel of FIG. 8.
Figure 12A:
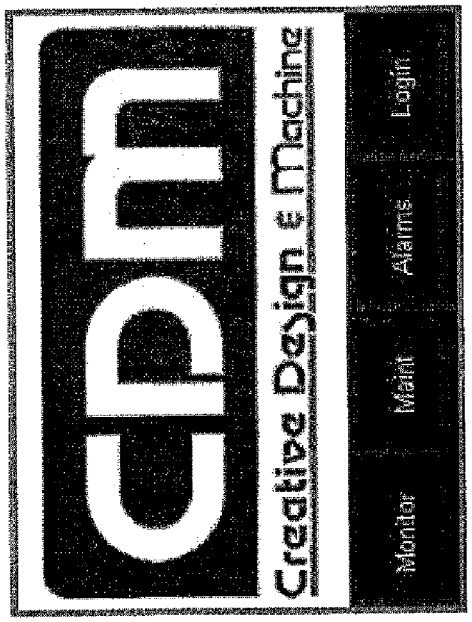
FIG. 12A is a first screen shot of the display from the touch screen of the human machine interface in the electrical panel of FIG. 8.
Figure 12B:
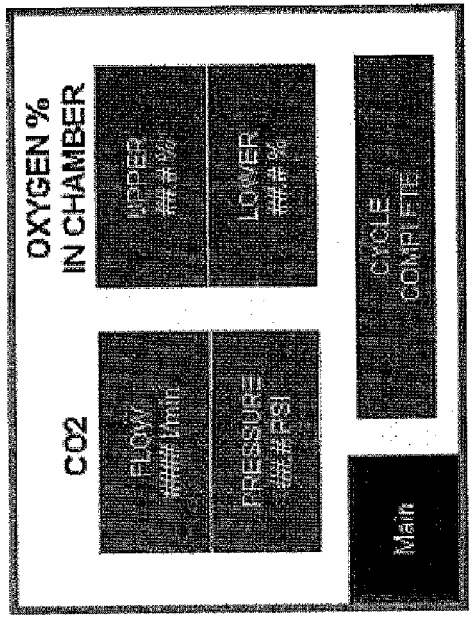
FIG. 12B is a second screen shot of the display from the touch screen of the human machine interface in the electrical panel of FIG. 8.
Figure 12C:
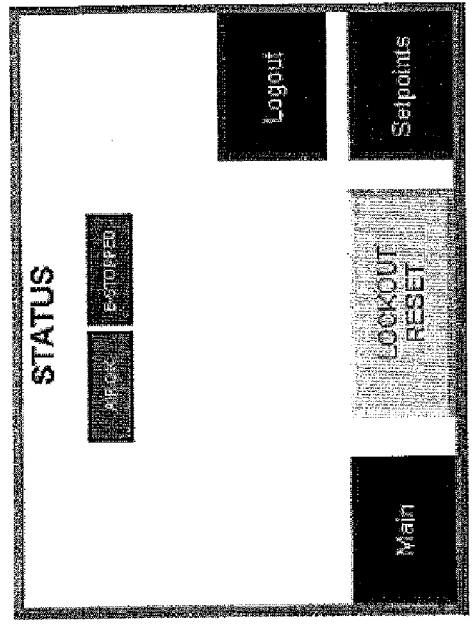
FIG. 12C is a third screen shot of the display from the touch screen of the human machine interface in the electrical panel of FIG. 8.
Figure 12D:
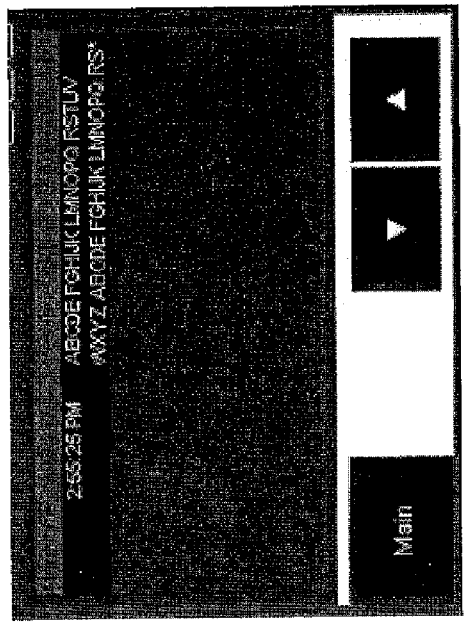
FIG. 12D is a fourth screen shot of the display from the touch screen of the human machine interface in the electrical panel of FIG. 8.

The improved animal euthanasia apparatus 10 of the current invention may include an electrical panel 40, which appears in the main views of the apparatus, and is shown enlarged in the details views of FIGS. 8-11. The electrical panel 40 may receive power from a power supply, which may be a single phase, 120 VAC, 60 Hz, 20 Amp service. The electrical panel 40 may be electrically coupled to each of the electrical components herein to supply power thereto, and to be able to control timely switching of those components on and off, as part of an automated process. Powering on and off of the unit may be controlled by a selector switch 42 configured to receive a key to control the availability of power to the device from the main electrical source (FIG. 10). To accomplish automation of the euthanasia process by the apparatus, a digital computer utilizing one or more processors or microprocessors may be utilized. A programmable logic controller (PLC) may also be utilized, such as the MicroLogixe 1400 by Allen Bradley 38 (FIG. 11), which may be used in combination with a human machine interface (HMI), such as the Allen Bradley PanelView Plus touch screen 35. The touch screen 35 may be used for monitoring conditions in the chamber 20 and to receive notification of any alarms (flow rates, line pressure of the euthanizing gas, chamber oxygen levels, etc.), and may also be used by the operator to program "set points" for a process, such as the time allotted for the gas to achieve a narcotic effect to render the animals unconscious, which may vary for different species of animals; the time of exposure by the animals to the lethal dose of gas necessary to assure euthanizing of the particular species; setting of the CO2 and/or Oxygen levels/concentrations; etc (see FIGS. 12A-12D).

Automation of the process may be more readily and safely accomplished through the incorporation of several other component parts into the improved animal euthanasia apparatus 10. An indicator light 43 may be used to detect when the door has been closed and locked by the electro-magnetic lock 56, after which the light may illuminate with a yellow color. A three-color beacon (green, amber, red) with an audible alarm 36 may extend away from the electrical panel 40 and may signal different stages of the process, as discussed hereinafter.

A cage in-place whisker switch may be used to confirm proper positioning of the cart/cage 100 within the chamber 20, where such detection of the cart/cage combination 100 by the switch may trigger a cage in-place light 44 on the electrical panel 40 to illuminate with a green color. A stop may be used to limit further travel of the cart/cage 100 into the interior cavity of chamber 20, after it has been properly positioned therein, as indicated by contact with the whisker switch.

The electrical panel 40 may also include a "cycle start" push button 45, which may illuminate with a green color after it has been depressed to begin the process, and which may be accompanied by an audible alarm that may beep one or more times at the start of the process. A "cycle stop" button 46 may be provided to prematurely stop the process prior to its automated completion. The "cycle stop" button 46 may illuminate with a red color once it has been depressed. Actuation of the emergency release handle 55E of latch 55 on the interior of the chamber 20 (FIG. 14) may similarly cause interruption of the normal cycle, in an "E-stop condition," which may cause unlocking of the electro-magnetic door lock 56, and advancing of the procedure to the "Fresh Air Introduction Cycle," where any further introduction of euthanizing gas (e.g., CO2) is stopped, the fresh air inlet dampers may be opened, and the exhaust gas fan and damper combination 67 may be activated. When the automated euthanasia process has proceeded normally to its completion, a "cycle complete" light 47 may illuminate with a green color.

The improved animal euthanasia apparatus 10 of the current invention may include a number of different alarms that may cause an alarm light 49 to be illuminated with a red color. For example, if an operator was trapped in the chamber and the start of the euthanizing process was accidentally initiated, the operator may simply trigger the E-stop condition," by actuating the emergency release handle of latch 55, which would set off the alarm. If the door fails to properly latch/lock, resulting in a door open fault, the alarm may be triggered. If the inflatable seal on the door experiences any loss in seal pressure (i.e., pump failure resulting in loss of pressure being exerted by the seal, or failure of the seal or of its connections), this will trigger the alarm. If any of the fans become overloaded, as mentioned previously, the alarm will be triggered. If there is a component failure, and the euthanizing gas is introduced outside of a programmed set point (e.g., a time set point is exceeded, a low gas flow is occurring, a high flow fault occurs, a low pressure condition occurs, or a high pressure condition occurs, etc.), the alarm may sound. To recover from an alarm, the reset button 48 may be depressed. As a safety precaution, the reset button 48 may be programmed to require entry of a password, in order to continue the process, once the erred condition has been resolved.

The improved animal euthanasia apparatus 10 of the current invention may also include a translucent observation window 21W in the front wall 21, which may be sealed against leakage with respect to the wall using any suitable seal, including a gasket seal. A wash-down rated fluorescent light may be used to illuminate the interior of the chamber for the operator to observe the animals therein. Merely to be exemplary, where the dimensions of the apparatus 10 are constructed to be approximately 84 inches high, by 79 inches wide, by 89 inches long, which may accommodate the cage/cart combination 100 of FIGS. 7A-7E being 24"×64"×70," the fluorescent light may be 48 inches long to provide sufficient illumination throughout the interior of the chamber. An upper portion of the apparatus 10 may be configured to receive one or more eye bolts (FIG. 17-18) or other means of lifting 77 of the device, for its transport within a facility, or for delivery to a recipient of the device.

Operation of the improved animal euthanasia apparatus 10 may generally be as follows. The operator may insert the key into the keyed power selector switch 42, and turn on power to the unit. The HMI 35 will illuminate indicating there is power to the unit. The "AIR ON" light 41 or "Air OK" window (on HMI screen) will illuminate green indicating there is compressed air to the machine. The chamber fluorescent light 78 and air circulation fan(s) 65 will turn on. The Block Heater/Vaporizer will power up. The operator may next open the CO2 supply valve 61 on the liquid CO2 tank 60, and may unlock and open the manual CO2 supply valve to the Chamber, A beacon and the alarm light 49 will be illuminated Red. The reset pushbutton 48 may be pressed after a short delay, after which the alarm light and beacon will no longer be illuminated.

The operator may next use the door handle/latch 55 to open the door 50 of the euthanasia chamber 20, and using the cage rail guides 28A and 28B inside the chamber, may load the cart/cage 100 therein until it is resting against the stop at the far end of the cage. The whisker switch will thus be contacted, and the "cage in place" indicator light 44 will be illuminated green. The door 50 may next be closed, and the door latch 55 will engage the door, holding the chamber door shut. The "READY" indicator light 43 and beacon 36 will illuminate yellow.

The "cycle start" push button 45 may be pressed. The "cycle start" pushbutton and beacon 36 will illuminate (green) and the audible alarm will beep once indicating the apparatus is in operation. The electro-magnetic door lock 56 will engage, preventing accidental opening of the chamber door 50 during the cycle. The inflatable seal 54 will inflate, sealing the bottom of the door 50, and the CO2 gas introduction cycle will begin. The fresh air inlet dampers 68 will be closed, and the CO2 exhaust fan/damper 67 will be off/closed. The fresh air exhaust damper 66 will open and the CO2 supply valve 63 will open. CO2 will begin to flow into the chamber 20. The HMI 35 will display the flow rate and line pressure of the CO2 being supplied into the chamber 20. Oxygen sensor(s) 76 in the chamber 20 will monitor the condition of the atmosphere in the chamber. When the Chamber atmosphere reaches set-point, the Chamber CO2 supply valve 63 will close, and the fresh air exhaust damper 66 will close. The O2 sensor(s) will continue to monitor the condition of the atmosphere in the chamber during the idle/holding phase of the cycle. The fresh air exhaust damper 66 and CO2 supply valve 63 may open/close if required, to maintain atmosphere set-point (CO2 concentration and atmospheric pressure), within a tolerance, over the duration of the idle/holding phase (time set-point) of the cycle. The O2 Monitor, CO2 Flow Meter, and CO2 Pressure sensor will respond accordingly.

After the idle/holding (time set-point) cycle is complete, the apparatus will begin the "Fresh Air Introduction Cycle." The CO2 supply valve 63 and fresh air exhaust fan/damper 66 will close and remain closed. The CO2 exhaust fan/damper 67 will be turned on/opened. This will be followed by the fresh air inlet damper(s) 68 opening. The O2 sensors will monitor the condition of the atmosphere in the chamber. When the Chamber atmosphere reaches set-point (safe-level), the CO2 exhaust fan 67 will turn OFF. The inflatable seal 54 will deflate, the electro-magnetic door lock 56 will disengage, and the cycle complete indicator light 47 will illuminate green. The audible alarm will beep (2 short beeps) and the beacon 36 will "blink" green indicating the current cycle is complete. The operator may unlatch and open the chamber door 50 and remove the cart/cage 100 from the chamber. Contact with the whisker switch will no longer be made, and the cage in place and cycle complete indicator lights, 44 and 47, as well as the beacon light 36 will go out.

Note that during the idle phase, where the animals are being exposed to CO2 within the chamber 20 and the inflatable seal 54 is being maintained in the inflated condition to prevent leakage of the CO2 from the chamber 20, the pressure within the chamber may be maintained at just slightly below the current atmospheric pressure in the facility where the apparatus is being operated. This would not be noticeable to the animals, but would serve to prevent adverse effects of a pressure differential, whereby higher pressure within the interior of the chamber could tend to counter the effectiveness of the inflatable seal, and could lead to small amounts of leakage of CO2, particularly where the inflatable seal meets the door edge seal.

It is fairly common to use CO2 for euthanizing of the animals in a process for which guidelines have been suggested by various agencies (see e.g.: "The AVMA Guidelines on Euthanasia"; and "Guidelines for the Use of Carbon Dioxide (CO2) for Rodent Euthanasia," by the University of Texas at Austin). Since the guidelines suggest that sudden exposure to high concentrations of CO2 can cause distress to the animals, and that unconsciousness should first be induced, the rate of introduction of the CO2 can be controlled in several different ways.

In a first alternate embodiment, the CO2 gas may be introduced at a suggested rate that is very slow, and would displace the air in the cage at a rate of 20% by volume, per minute. During this time the circulation fan 65 may be used to cause mixing of the CO2 and air. As the concentration of CO2 reaches 40% to 50%, unconsciousness would occur in most species of animals, which may be verified visually through the observation window 21W. The CO2 concentration could subsequently be increased to lethal levels and held thereat for the prescribed time period.

In another alternate embodiment of the procedure, at least two oxygen sensors 76 may be mounted in the chamber 20, at distinctly different heights. CO2 is denser than air, and thus tends to sink to the bottom of the chamber 20, when introduced therein, and thus accounts for the relative positioning in the chamber 20 of the fresh air exhaust damper 66, the CO2 exhaust fan/damper 67, and the fresh air inlet damper 68. Therefore, a first oxygen sensor may be mounted at a height that would correspond to the chamber being filled with CO2 to a volume that, when mixed with the remaining air, would create a narcosis inducing concentration of the CO2-air mixture for the particular species of animal (i.e., 40-50%). After filling the chamber to that level, the CO2 introduction process may be temporarily ceased, and the circulation fan 65 may be used for such mixing. After unconsciousness has been observed in the animals, the CO2 introduction process may again proceed, until the level of CO2 has risen to the reach an O2 sensor that is mounted at an elevated height in the chamber 20, which would result in substantially a 100% concentration of the euthanizing gas therein. Different concentration levels of euthanizing gas for inducing unconsciousness in different species of animals may be programmed into the PLC 38, and additional oxygen sensors may be utilized to sense the required height for the initial introduction of gas for anesthetization therein, for the particular species, using various different inhalants. As noted earlier, in regard to the construction of cart/cage 100, this alternate embodiment of filling the chamber with gas may necessitate that the lowest most cage situated within the chamber be at a level that would be above the lower oxygen sensor, to avoid suddenly immersing the lowermost animals therein to the inflowing CO2, prior to reaching the 40% level and the start of the mixing stage.

The examples and descriptions provided merely illustrate a preferred embodiment of the present invention, Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

The invention claimed is:

1. A device for euthanizing animals, said device comprising:
    a chamber, said chamber comprising one or more walls forming a cavity, and an opening into said cavity, said chamber comprising a threshold at a bottom portion of said opening, said opening configured to permit wheeled travel of a cage over said threshold and into said chamber;
    a seal, said seal being secured to said chamber about said opening, except at said threshold;
    a door, said door configured to be releasably received over said opening in said chamber, against said seal, said door comprising an inflatable seal configured to inflate, to thereby seal said door with respect to said threshold, said chamber thereby configured to be generally sealed against leakage;
    a door latch;
    a supply valve, said supply valve configured to control flow of a euthanizing gas into said chamber;
    a fan and damper secured in an air exhaust opening in said chamber;
    a fan and a damper secured within an exhaust gas opening in said chamber; and
    a damper secured within a fresh air inlet opening in said chamber.

2. The device for euthanizing animals according to claim 1 further comprising a cage, said cage configured to receive one or more animals to be euthanized, said cage comprising one or more wheels and configured to be wheeled over said threshold and through said opening to be received within said chamber.

3. The device for euthanizing animals according to claim 2 further comprising a keyed selector switch configured to receive a key to control power available to said device from a source of power.

4. The device for euthanizing animals according to claim 3 further comprising an electro-magnetic lock configured to lock said door.

5. The device for euthanizing animals according to claim 4 further comprising a sensor configured to signal when said door is open or closed.

6. The device for euthanizing animals according to claim 5 further comprising a whisker switch configured to detect when said cage is positioned completely within said cavity of said chamber.

7. The device for euthanizing animals according to claim 6 further comprising a cage stop, said cage stop configured to limit the wheeled travel of said cage, when said cage is completely within said cavity of said chamber.

8. The device for euthanizing animals according to claim 6 further comprising one or more oxygen sensors configured to measure the oxygen level in said chamber.

9. The device for euthanizing animals according to claim 8 further comprising a gas flow sensor configured to measure a flow rate of the euthanizing gas through said supply valve.

10. The device for euthanizing animals according to claim 9 further comprising a euthanizing gas pressure sensor configured to measure a pressure in said supply valve.

11. The device for euthanizing animals according to claim 10 wherein said supply valve comprises a solenoid valve; and wherein said damper in said air exhaust opening, said damper in said exhaust gas opening, and said damper in said air inlet opening are each actuated by a respective solenoid.

12. The device for euthanizing animals according to claim 11 further comprising a programmable logic controller configured to automate the operation of said device upon receipt of said key in said keyed selector switch.

13. The device for euthanizing animals according to claim 12 further comprising a human machine interface (HMI), said HMI comprising a touch-screen, and said HMI configured to do one or more of the following: to program one or more set points for the automated operation of said device; to display a flow rate and line pressure of the euthanizing gas; and to display an oxygen level in said chamber from said O2 sensors.

14. The device for euthanizing animals according to claim 13 further comprising an emergency release handle accessible from within said cavity of said chamber, and being configured to unlock said door and to cease the automated operation of said device.

15. The device for euthanizing animals according to claim 14 wherein said one or more oxygen sensors comprises: a first oxygen sensor positioned at an upper portion of said one or more walls of said chamber, and a second oxygen sensor positioned at a lower portion of said one or more walls of said chamber.

16. The device for euthanizing animals according to claim 15 further comprising a second door, said second door configured to be releasably received over a second opening in said chamber, against a second seal, said second door comprising an inflatable seal configured to inflate, to thereby seal said second door with respect to a second threshold, said chamber thereby configured to permit said cage to be wheeled through said first opening, over said first threshold, and into said chamber to euthanize animals therein, and to be wheeled through said second opening, over said second threshold, out from said chamber, for removal of said cage therefrom.

17. The device for euthanizing animals according to claim 1 further comprising a gas manifold configured to receive the euthanizing gas from said supply valve and to distribute the euthanizing gas within said chamber.

18. The device for euthanizing animals according to claim 1 further comprising an air circulation fan.

19. The device for euthanizing animals according to claim 1 further comprising a translucent observation window fixedly secured and sealed in a second opening in said one or more walls of said chamber.

20. The device for euthanizing animals according to claim 1 further comprising a door brush configured to sweep said threshold when said door is closed.

21. The device for euthanizing animals according to claim 20 further comprising an indicator light configured to light when said cage is completely within said cavity of said chamber.

22. The device for euthanizing animals according to claim 1 wherein said seal comprises one or more of a push-on edge seal configured to be received upon an edge of the periphery of said opening in said chamber; and a gasket secured to an outer side of said opening in said chamber.

23. The device for euthanizing animals according to claim 1 wherein said air exhaust opening and said fresh air inlet opening are positioned at an upper portion of said one or more walls of said chamber; and wherein said exhaust gas opening is positioned at a lower portion of said one or more walls of said chamber.

24. The device for euthanizing animals according to claim 1 further comprising a filter releasably secured in one or more of said air inlet opening; said air exhaust opening; and said exhaust gas opening.

25. The device for euthanizing animals according to claim 1 further comprising a first rail guide and a second rail guide, said first and second rail guides configured to guide said cage into said chamber during its travel therein.

26. The device for euthanizing animals according to claim 1 further comprising means for lifting said device, said means for lifting being positioned in a top portion of said chamber.

27. The device for euthanizing animals according to claim 1 wherein said door being configured to be releasably received in said opening comprises said door being pivotally attached to said one or more walls of said device.

28. The device for euthanizing animals according to claim 1 further comprising a fan in said fresh air inlet opening.

29. The device for euthanizing animals according to claim 1 wherein said cage is partitioned to thereby individually enclose a plurality of animals therein.

30. The device for euthanizing animals according to claim 1 further comprising a heater configured to maintain a desirable temperature of the euthanizing gas.

31. A method of euthanizing one or more animals comprising the following steps:
   placing one or more animals in a wheelable cage;
   wheeling the cage across a threshold of a door opening and into a chamber of a euthanizing device;
   closing and latching a door for sealing of a first and second side and a top of the door against a seal;
   inflating a bottom seal for sealing of the door against said threshold;
   turning on a power supply;
   closing a fresh air intake damper and a CO2 exhaust damper;
   opening a fresh air exhaust damper;
   introducing a flow of CO2 into the chamber;
   using one or more oxygen sensors for monitoring the concentration of CO2 in the chamber and ceasing the flow of CO2 upon reaching a concentration needed therein for producing unconsciousness in the one or more animals;
   closing the fresh air exhaust damper and using a fan to circulate the CO2 within the chamber for a first period of time;
   opening the fresh air exhaust damper and introducing a flow of CO2 into the chamber until reaching a concentration therein sufficient for euthanizing of the one or more animals;
   closing the fresh air exhaust damper; using a pressure sensor for monitoring pressure in the chamber and for supplying a flow of CO2 as necessary to maintain atmospheric pressure in the chamber;
   waiting for a second period of time; opening the fresh air intake damper and the CO2 exhaust damper and turning on the CO2 exhaust fan;
   using the one or more oxygen sensors for determining when the chamber contains sufficient oxygen for occupancy by an operator;
   unlatching and opening of the door; and removing the cage from the chamber by wheeling the cage across said threshold.

32. The method of euthanizing one or more animals according to claim 31, further comprising: positioning a series of said oxygen sensors in said chamber at incrementally higher positions therein, and using one of said incrementally positioned oxygen sensors for determining a percentage by volume of CO2 gas in said chamber needed for said concentration to produce unconsciousness in a particular species of the one or more animals; and
   mixing the air and CO2 in said chamber using a fan.

33. The method of euthanizing one or more animals according to claim 32, further comprising partitioning said wheelable cage into respective cage portions corresponding to the one or more animals to be euthanized.

34. The method of euthanizing one or more animals according to claim 31, further comprising positioning said fresh air exhaust damper in an uppermost portion of said chamber, and positioning an oxygen sensor proximate to said fresh air exhaust damper, for determining when the CO2 gas introduced into said chamber displaces substantially all of the air therein, for euthanizing of the one or more animals during the second time period.

35. The method of euthanizing one or more animals according to claim 31, further comprising introducing said flow of CO2 into the chamber at a rate sufficient for displacing 20% of an atmosphere of air in the cavity of the chamber per minute.

* * * * *